US008394477B2

(12) United States Patent
Hill et al.

(10) Patent No.: US 8,394,477 B2
(45) Date of Patent: Mar. 12, 2013

(54) VISION CONTROL PANEL ASSEMBLY WITH A CONTRASTING COLORED LINER

(75) Inventors: G. Roland Hill, Cheshire (GB); Mark David Godden, La Metairie (FR)

(73) Assignee: Contra Vision Ltd., Stockport (GB)

( * ) Notice: Subject to any disclaimer, the term of this patent is extended or adjusted under 35 U.S.C. 154(b) by 255 days.

(21) Appl. No.: 12/663,184

(22) PCT Filed: Jun. 4, 2008

(86) PCT No.: PCT/IB2008/052189
§ 371 (c)(1),
(2), (4) Date: Jan. 26, 2010

(87) PCT Pub. No.: WO2008/149301
PCT Pub. Date: Dec. 11, 2008

(65) Prior Publication Data
US 2010/0181020 A1 Jul. 22, 2010

Related U.S. Application Data
(60) Provisional application No. 60/941,882, filed on Jun. 4, 2007.

(51) Int. Cl.
*B32B 9/00* (2006.01)
*B32B 7/12* (2006.01)
*B32B 3/10* (2006.01)

(52) U.S. Cl. ........ 428/40.1; 428/42.1; 428/98; 428/131; 428/138

(58) Field of Classification Search ................. 428/40.1, 428/42.1, 98, 131, 137, 138, 156; 283/72, 283/94, 100, 101, 105, 107–111; 101/115
See application file for complete search history.

(56) References Cited

U.S. PATENT DOCUMENTS

| | | | |
|---|---|---|---|
| 5,250,336 | A | 10/1993 | Greuse et al. |
| 5,609,938 | A | 3/1997 | Shields |
| 5,773,110 | A | 6/1998 | Shields |
| 5,858,155 | A | 1/1999 | Hill et al. |
| 6,210,776 | B1 | 4/2001 | Hill |
| 6,212,805 | B1 | 4/2001 | Hill |

(Continued)

FOREIGN PATENT DOCUMENTS

| | | | |
|---|---|---|---|
| JP | 6-55699 | A | 3/1994 |
| JP | 10-282918 | A | 10/1998 |

(Continued)

OTHER PUBLICATIONS

International Search and Written Opinion report for PCT International Patent Application No. PCT/IB2008/052189, mailed on Jun. 5, 2009.

(Continued)

*Primary Examiner* — Patricia Nordmeyer
(74) *Attorney, Agent, or Firm* — Pillsbury Winthrop Shaw Pittman LLP

(57) ABSTRACT

An assembly includes a light-permeable film layer, a release liner, and a print pattern. The print pattern includes a base layer. The print pattern sub-divides the film layer into a plurality of discrete base layer areas and/or a plurality of transparent areas. The base layer includes a design imaging surface of a first color. The release liner includes an imperforate material. The release liner includes a release surface. The imperforate material when viewed through said light permeable film layer is a second color contrasting with said first color by the graytone of said second color differing from the graytone of said first color by at least 10%. This contrast may provide a more realistic perception of how the assembly will look in situ (e.g., on a window).

39 Claims, 16 Drawing Sheets

U.S. PATENT DOCUMENTS

| | | | |
|---|---|---|---|
| RE37,186 | E | 5/2001 | Hill |
| 6,267,052 | B1 | 7/2001 | Hill et al. |
| 6,506,475 | B1 | 1/2003 | Hill |
| 6,552,820 | B1 | 4/2003 | Hill |
| 6,899,775 | B2 | 5/2005 | Hill et al. |
| 2002/0162874 | A1 | 11/2002 | Spolidoro et al. |
| 2005/0112315 | A1 | 5/2005 | Farmer |

FOREIGN PATENT DOCUMENTS

| | | | |
|---|---|---|---|
| JP | 10-511901 | T | 11/1998 |
| JP | 2000-81842 | A | 3/2000 |
| JP | 3080805 | U | 10/2001 |
| WO | 97/47481 | A1 | 12/1997 |
| WO | 2006/002467 | A1 | 1/2006 |
| WO | 2007/113619 | A2 | 10/2007 |

OTHER PUBLICATIONS

Notice of Reasons for Rejection as issued for Japanese Patent Application No. 2010-510941 dated Sep. 18, 2012.

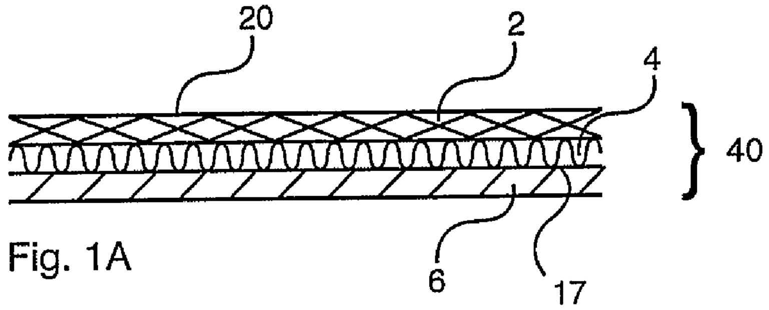
Fig. 1A
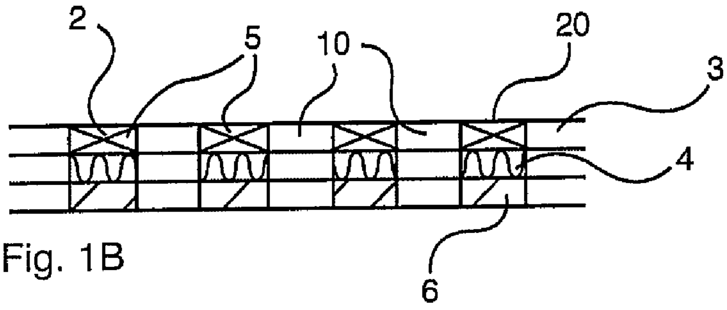
Fig. 1B
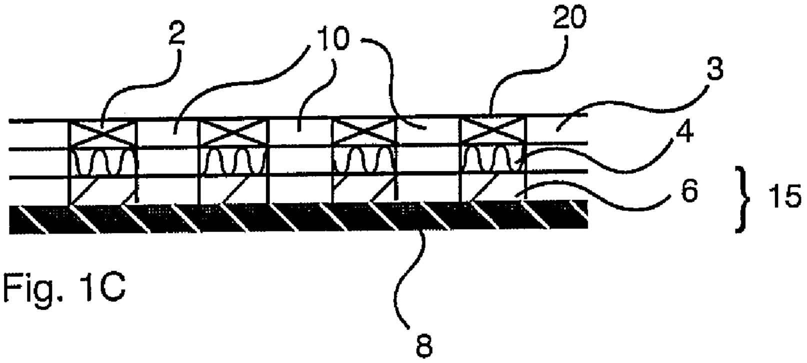
Fig. 1C
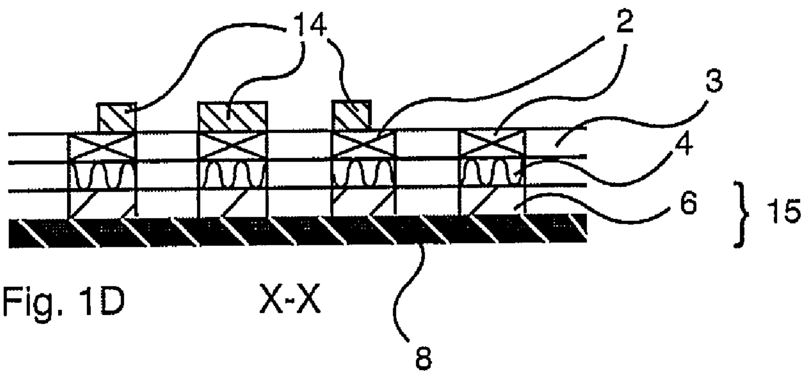
Fig. 1D X-X

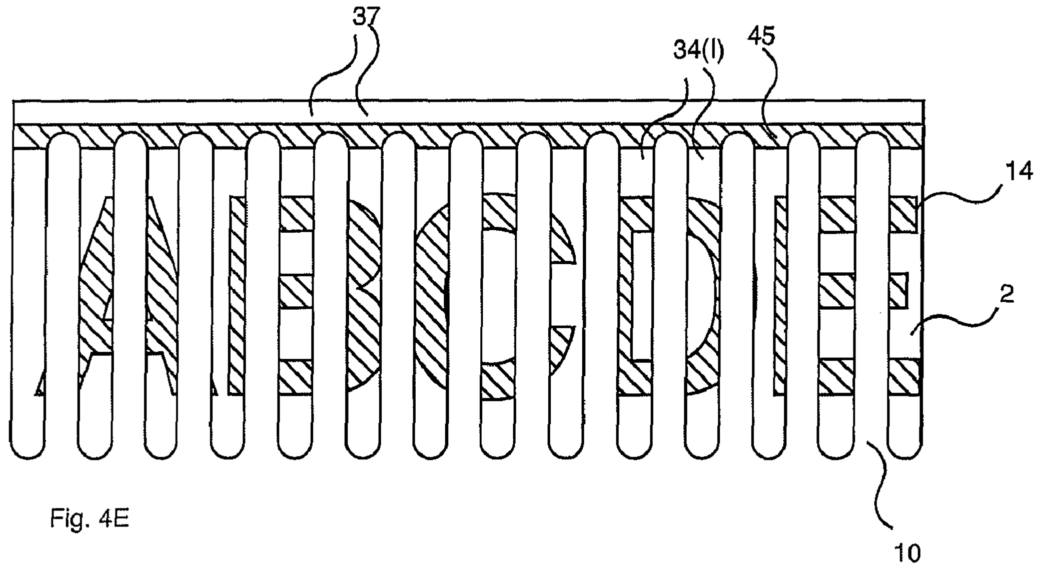
Fig. 4E
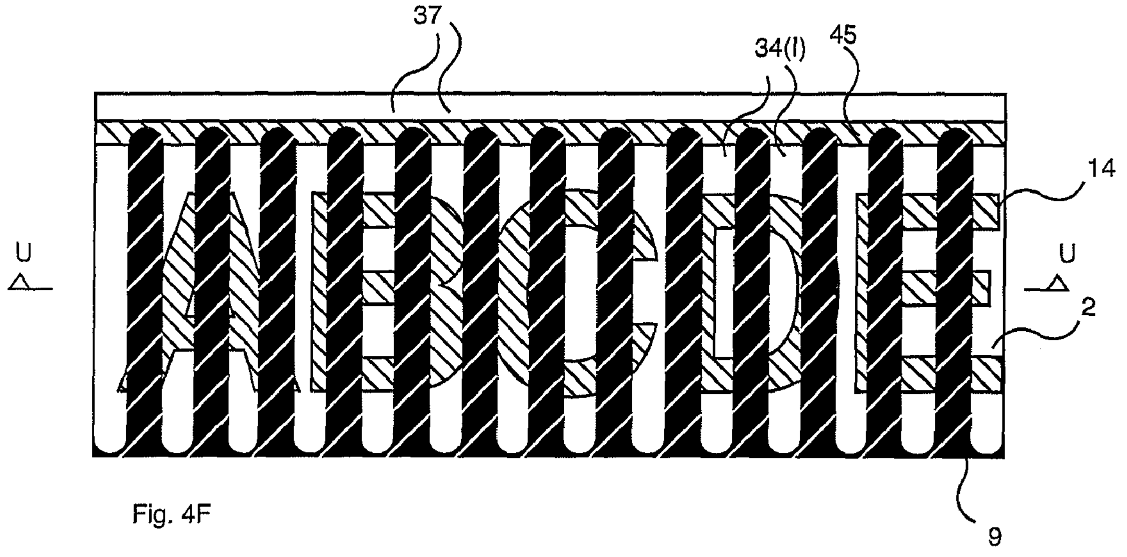
Fig. 4F
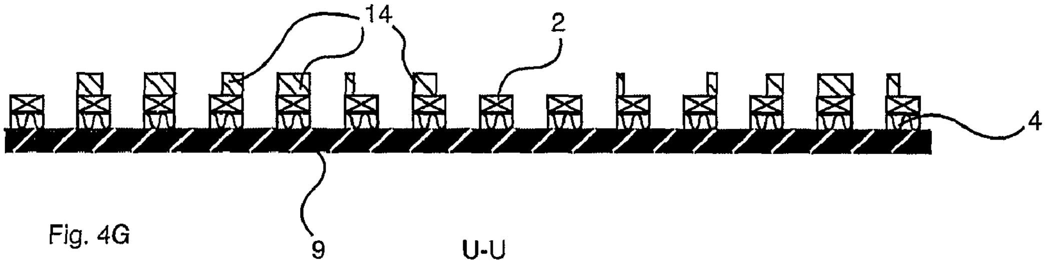
Fig. 4G U-U 23
4
7
41

24
20
20
25
23
4
7

14
24
25
23
4
7

14
24
25
23
4
7

14
24
25
23
4
7
16

VISION CONTROL PANEL ASSEMBLY WITH A CONTRASTING COLORED LINER

CROSS-REFERENCE

This application claims the benefit of priority to U.S. Provisional Patent Application No. 60/941,882, titled "Vision Control Panel Assembly With A Contrasting Liner," filed on Jun. 4, 2007, which is incorporated herein by reference.

BACKGROUND OF THE INVENTION

1. Field of the Invention

The present invention relates generally to the field of self-adhesive film assemblies for application to windows to make vision control panels, for example one-way vision panels having a design on one side which is not visible from the other side, the other side allowing through vision.

2. Description of Related Art

Vision control panels are well known, for example panels having a design superimposed on an opaque silhouette pattern as disclosed in U.S. U.S. Reissue Pat. No. 37,186 and panels having a design superimposed on a translucent "base pattern", which enables the design to be illuminated from the other side of the panel, as disclosed in U.S. Pat. No. 6,212,805. Both of these patents disclose self-adhesive assemblies comprising a light-permeable film facestock layer, an adhesive layer and a removable protective film layer, sometimes referred to as a liner or release liner. Such self-adhesive assemblies include facestock film which is perforated vinyl, or vinyl cut into discrete, elongated areas, for example stripes, or non-perforated clear film.

In September 1993 Visual Technologies, Inc., N.C., USA, made public the application of an additional non-perforated backing layer to the perforated liner of a perforated self-adhesive vinyl assembly, as also disclosed in U.S. Pat. Nos. 5,773,110 and 5,609,938. The benefits of an assembly with a non-perforated backing layer are various, including the ability to hold the assembly with a vacuum suction device, for example on the bed of a screen printing press, and to prevent ink from a digital inkjet printing press passing though the perforation holes, for example onto a printing press platen. U.S. Pat. No. 5,858,155 discloses a non-perforated replacement liner applied to a perforated adhesive layer after removal of a temporary perforated liner, to achieve the same and additional benefits.

Such products are sometimes referred to as perforated base materials or perforated self-adhesive assemblies or perforated film assemblies or perforated self-adhesive films and are typically imaged by one of a number of printing techniques, including screen printing and various digital imaging methods, for example inkjet printing, electrostatic transfer printing and thermal mass transfer printing or sublimation. A perforated film assembly for subsequent application to the outside of a window typically has a white-on-black facestock, or a white facestock in conjunction with a black adhesive. An additional non-perforated backing layer is typically provided by a white self-adhesive "application tape" or by a heat-bonded film, for example a colorless, polypropylene film. A replacement liner is typically white or clear, typically a white, silicone-coated paper or a silicone-coated clear polyester. When imaged with a design, following removal of the liner and application to a window, the design is typically intended to be seen from outside the window, for example of a building or vehicle, illuminated by natural daylight. Designs such as advertisements or signs are typically seen, therefore, against a relatively dark background of the interior of the building or vehicle. Known techniques of "undercolor removal" of inks have been used to compensate for this background darkening effect, also disclosed in PCT/US96/09888.

Perforated static cling film assemblies with a non-perforated liner and no adhesive layer are also known.

U.S. Pat. No. 6,552,820 discloses a method of printing a vision control panel in which a transparent substrate is partially printed with an opaque print pattern, for example a print pattern of lines. An optical scanning device identifies leading and trailing edges of the select areas of printing and instructs a digital printing machine to print a superimposed layer, typically a design, on areas of the print pattern, for example a pattern of opaque white on black lines orientated perpendicular to the direction of primary movement of inkjet printheads, which are recognised in contrast to the transparent substrate that is unprinted between the opaque printed lines.

U.S. Pat. No. 5,250,336 (Greuse) discloses the use of a liner of contrasting color in a self-adhesive assembly in the field of kiss-cut, self-adhesive labels, to enable the quality of the cutting of the edges of kiss-cut labels to be more easily assessed following "weeding" of the surrounding unwanted facestock material.

SUMMARY OF EMBODIMENTS OF THE INVENTION

When imaging various of the above-discussed (and/or other) products, there is a problem that the printed image appearance, when seen against a white or clear imperforate layer, appears to be "washed out" or weak in visual impact. If the design is printed by a method which deposits ink through the perforation holes onto an imperforated layer which does not have an ink-receptive surface, for example a silicone coating to a release liner or an adhesive coating to an application tape used as a non-perforated layer, the ink or other marking material does not have normal coverage. For example, if the design is solvent inkjet printed, the ink typically does not adhere to and coalesces or forms globules or otherwise does not cover all the white or clear solid layer. No image is applied to the hole areas with electrostatic or thermal transfer printing. This reduction in imaged area does not give a good visual impression of the product before application to a window and does not properly represent its final appearance. As a result, print operators are known to apply more design colorants than are actually required or desirable in the finished product, for example unnecessarily repeating applications of inkjet printing, in order to seek to obtain a better visual appearance upon printing. Apart from being excessively costly and visually unnecessary and/or visually undesirable in the finished product, the application of excessive ink is not desirable environmentally, for example because of solvents being emitted from the imaged product, either locally or in a global context, or in the energy consumption of curing solvent ink.

Also, a curing regime suited to the imaging surface is typically not as effective at the bottom of the perforation holes, on top of the solid liner surface. There is the possibility that uncured inks, for example solvent inkjet inks lying on the non-perforated layer, have a deleterious effect on the other materials in the assembly, for example by solvents attacking the pressure-sensitive adhesive layer.

A similar problem exists with vision control panels comprising cut film, for example self-adhesive vinyl lines or "stripes" disposed on a "solid" release liner, typically a white, silicone-coated paper, as disclosed in U.S. Reissue Pat. No. 37,186, U.S. Pat. Nos. 6,212,805, 6,267,052, 6,899,775 and U.S. Patent Application 60/727,462 and with vision control panels comprising a clear, transparent imperforate self-adhesive film, for example as disclosed in U.S. Reissue Pat. No. 37,186, U.S. Pat. Nos. 6,212,805, 6,210,776, 6,552,820, 6,506,475, 6,267,052 and 6,899,775.

Conversely, UV cured inks, for example applied by a digital inkjet machine, may be cured on a white or clear non-perforated liner component of a perforated or cut film self-adhesive assembly and give the visual impression, before the liner is removed, of a design applied over a continuous white or clear surface. This provides an overly bold impression of the design compared to the reduced impact caused by removal of the liner and application of the imaged perforated or cut film to the window of a building or vehicle with a relatively dark interior compared to external daylight.

One or more embodiments of the present invention overcome one or more of the above-discussed deficiencies of the prior art by providing a contrasting color release liner. Such a contrast may improve the perception of the design on an imaged self-adhesive film assembly used for making a vision control panel:

(A) when first printed on the self-adhesive film assembly compared to the paler, "washed out", "whitened" or otherwise weaker appearance of a design printed on a prior art self-adhesive film assembly with a white or colorless release liner, thus tending to reduce the common prior art practice of print operatives applying more ink than is necessary or desirable, in order to achieve a stronger image, (B) when observed as an imaged self-adhesive assembly, for example by a customer, before removal of the liner, thus reducing and/or eliminating the paler, washed out, whitened or otherwise weaker appearance of the imaged prior art products, and (C) so that it will more closely resemble the finished vision control panel or see-through graphic panel following removal of the release liner and application of the imaged light permeable film layer to a window, the window typically having a relatively dark interior background against which the design is observed.

According to one embodiment of the present invention, an assembly comprises a light-permeable film layer, a release liner, and a print pattern, said print pattern comprising a base layer, said base layer comprising:

(i) a perforated film, (ii) a cut film layer, said cut film layer cut into a plurality of elongate film layer areas, or (iii) marking material applied to an imperforate transparent film, said print pattern sub-dividing said film layer into a plurality of discrete base layer areas and/or a plurality of transparent areas, said base layer comprising a design imaging surface of a first color, said release liner comprising an imperforate material, said release liner comprising a release surface, characterized in that said imperforate material when viewed through said light permeable film layer comprises a second color contrasting with said first color by the graytone of said second color differing from the graytone of said first color by at least 10%.

Another embodiment of the invention comprises a method of making an assembly, said assembly comprising a light permeable film layer, a release liner, and a print pattern, said print pattern comprising a base layer, said print pattern sub-dividing said assembly into a plurality of discrete base layer areas and/or a plurality of discrete transparent areas, said base layer comprising a design imaging surface of a first color, said method comprising:

(i) providing a self-adhesive assembly comprising a facestock film layer and an initial release liner removably attached to said facestock film layer, (ii) forming said base layer of said print pattern by:

(1) perforating said self-adhesive assembly through said facestock film layer and said initial release liner to form a perforated facestock film layer and a perforated initial release liner removably attached to said perforated facestock film layer, said perforated facestock film layer forming said base layer, and adhering an imperforate material of said second color to said perforated initial release liner, said perforated initial release liner and said imperforate material forming said release liner, (2) perforating said self-adhesive assembly through said facestock film layer and said initial release liner to form a perforated facestock film layer and a perforated initial release liner removably attached to said perforated facestock film layer, said perforated facestock film layer forming said base layer, and removing said perforated initial release liner and replacing said perforated initial release liner with said release liner, said release liner comprising said second color, (3) kiss-cutting said facestock film layer into a plurality of elongate areas of said facestock film layer, removing alternate elongate areas to leave a plurality of elongate film areas forming said base layer, said initial release liner comprising said second color and forming said release liner, or (4) applying said base layer within said print pattern onto said facestock film layer, said facestock film layer being transparent, wherein said release liner comprises an imperforate material of a second color contrasting with said first color by a graytone interval of at least 10%, and wherein said second color is visible through said light permeable film layer.

Another embodiment of the invention comprises a method of making a vision control panel comprising:

(i) making one of the above-discussed assemblies, (ii) applying a design to said design imaging surface of said first color to form an imaged light permeable film layer, (iii) removing said release liner of said second color contrasting with said first color by a graytone interval of at least 10%, and (iv) applying said imaged light permeable film layer to a transparent material.

A "vision control panel" comprises a transparent sheet and a print pattern which partially covers the transparent sheet which, together with the conditions of illumination on either side of the panel, modify the visibility from one side of the panel of objects spaced from the other side of the panel.

A "see-through graphic panel" is a vision control panel comprising a design superimposed on or forming part of the design imaging surface within the print pattern. U.S. U.S. Reissue Pat. No. 37,186 discloses see-through graphic panels comprising an opaque print pattern or "silhouette pattern." U.S. Pat. No. 6,212,805 discloses see-though graphic panels comprising a translucent design and a translucent print pattern or "base pattern."

As one of ordinary skill in the art would appreciate, through vision can typically be obtained in either direction through a vision control panel when the level of illumination perceived through panel from the far side of the panel is high enough relative to the illumination reflected from and/or transmitted through the print pattern and any design when observed from the near side of the panel A "light permeable material" allows the transmission of light.

In the context of this invention, the term "transparent" refers to either a transparent material or a void or voids in a film layer, for example perforation holes in a perforated film or gaps between cut film "stripes".

A "transparent material" allows an observer on one side of the transparent material to focus on an object spaced from the other side of the transparent material. Examples of transparent materials include glass and transparent plastics, for example transparent polyester, acrylic, polycarbonate or pvc.

A "print pattern" subdivides the light permeable film layer into a plurality of discrete print areas and/or a plurality of discrete transparent areas. The print pattern also subdivides the assembly into a plurality of discrete base layer areas and/or a plurality of discrete areas devoid of a base layer. The print pattern is optionally a regular geometric element in a regular layout, such as a pattern of dots, a regular geometric element in an irregular layout, a free form element in a regular layout, a free form element in an irregular layout or a combination of regular and free-form elements in regular and/or irregular layouts. Instead of a number of separate elements with an interconnected transparent zone, the print pattern can be a pattern of separate print pattern elements, such as a pattern of lines with separate gaps between the lines. The print pattern may be formed by interconnected print pattern elements with separate transparent areas, such as a net, grid or mesh pattern, or a perforated material.

A "design" comprises a design color layer of different color to the first color of the design imaging surface. The term design is intended to include any graphic image such as indicia, a photographic image or a multi-color image of any type. The design is typically perceived to be visually independent of the elements of the print pattern both immediately after application of the design to the assembly before removal of the release liner to make a vision control panel and after removal of the release liner from the imaged assembly before applying the imaged light permeable film layer to the transparent material to form a vision control panel. This feature can be tested by an observer adjacent to one side of the imaged assembly or vision control panel from which the design is normally visible, who moves away from the one side of the panel in a perpendicular direction from the imaged assembly or vision control panel until discrete and/or interconnected elements of the print pattern can no longer be resolved by the eye of the observer, the design remaining clearly perceptible. Design imaging techniques include litho printing, screen printing and various digital imaging methods, for example inkjet printing, electrostatic transfer printing and thermal mass transfer printing or sublimation.

A "design color" can be any color of any "hue", "saturation" and "value" or graytone (determining its darkness or lightness), including monochromatic black, white or gray, known as achromatic colors, or any metallic color such as silver or gold.

There are several different systems of color measurement and parameters for describing color including hue, saturation and value.

A "hue" is a pure color defined by a wavelength of light. "Saturation" refers to the purity of a color in relation to its gray content. Maximum saturation or "chroma" colors contain no gray.

"Value" refers to how light or dark a color is, sometimes referred to as brightness or luminance, described for the purpose of this invention as a "graytone" on a "grayscale", which may be numerically quantified, typically from 0 (black) to 256 (white), or as a percentage from 0% (white) to 100% (black). The difference between two values of gray or graytones is known as an "interval" or a "contrast value" or herein as a "graytone interval" or a "difference in graytone".

The term "second color" or "contrasting color" according to the present invention includes a single color or a plurality of colors with an average difference in graytone of at least 10% from the first color of the design imaging surface, though in practice an average difference in graytone of at least 30% from the first color is preferable. The term "average difference in graytone" means a weighted average, sometimes referred to as a Gaussion blur, of a non-uniform second color, for example of a mottled, streaked, halftone or bitmap appearance of a plurality of colors. The "second color" is typically a gray or plurality of achromatic colors, in order to avoid perceived modifications of the hues in the design colors, although it should be understood that a true achromatic gray is not achievable with so-called subtractive colorants such as inks, pigments, dyes and toners. There is inevitably some hue to a printed gray, however slight, and in practice a printed gray optionally comprises deposits of cyan, magenta and yellow as well as black ink on a white design imaging surface which is not truly achromatic white.

In the context of this invention, a colorless, non-pigmented transparent or translucent material is deemed to have a graytone of 0% (zero percent). For example, if the design imaging surface is transparent, any second color having a graytone of at least 10% is deemed to have a difference in graytone of at least 10% to that of the transparent "first color". Conversely, for example, a colorless, non-pigmented transparent or translucent release liner would not provide a 10% graytone color contrast to a white design imaging surface, but would have zero percent contrast.

A cross-section can be taken through a typical assembly of the invention comprising a release liner having two outer edges, a light permeable film layer and a plurality of alternate base layer portions and portions devoid of base layer, each base layer portion comprising two outer edges. The average width between the two edges of the base layer portions is typically less than 10 mm, preferably less than 6 mm, and more preferably less than 3 mm. The average width of the portions devoid of base layer is typically less than 10 mm, preferably less than 6 mm, and more preferably less than 3 mm. Following application of the design comprising the design imaging layer, the cross-section in the same position as above comprises the base layer portions imaged by the design imaging layer, the design imaging layer optionally being applied to all or a numerically reduced plurality of said plurality of base layer portions, the design imaging layer typically not covering all of the design imaging surface of said plurality of base layer portions, the design being singular and perceived to be independent of the print pattern comprising the base layer portions, as outlined above.

In a first embodiment of the invention, a perforated film assembly comprises:

(i) a perforated film layer comprising a design imaging surface of a first color, for example a white design imaging surface of a white on black vinyl film layer or a white vinyl film layer, (ii) a perforated adhesive layer, for example a clear or black pressure-sensitive adhesive, (iii) a perforated release liner, for example a perforated paper liner with a silicone coating, and (iv) an additional non-perforated backing layer of a second color contrasting with the first color of the perforated film layer, for example dark gray or black, which is adhered to the perforated release liner to form a composite release liner. The additional non-perforated backing layer acts as a background to a design applied to the perforated film layer imaging surface before removal of the composite release liner comprising the perforated liner and additional non-perforated backing layer and application of the imaged perforated film layer to a transparent material, for example a window, by means of the perforated adhesive layer, to form a see-through graphic panel. The additional non-perforated backing layer is optionally paper adhered to the perforated release liner, for example a self-adhesive paper, for example a so-called application tape, or a plastic film, for example of polypropylene, for example heat bonded to the perforated release liner. The second color is either that of the parent material of the additional non-perforated backing layer or a coating applied to it, for example the pressure-sensitive adhesive layer of a self-adhesive application tape or a colored layer printed or otherwise coated onto the non-perforated backing layer.

In a second embodiment, a perforated film assembly comprises:

(i) a perforated film comprising a design imaging surface of a first color, for example a white design imaging surface of a white on black vinyl film layer or a white vinyl film layer, (ii) a perforated adhesive layer, for example a clear or black pressure-sensitive adhesive, and (iii) a non-perforated release liner, for example a release-coated paper, for example a silicone-coated paper, or silicone-coated polyester film, for example a replacement liner according to U.S. Pat. No. 5,858,155, comprising a second color contrasting with the first color of the perforated film layer, for example gray or black.

In a third embodiment, a perforated film assembly comprises:

(i) a perforated film comprising a design imaging surface of a first color and having adhering properties to glass, for example a static cling film, for example comprising white-on-black highly plasticized pvc film or, for example, a urethane coated polyester film, and (ii) a non-perforated release liner, for example a release-coated paper, for example a silicone-coated paper, comprising a second color contrasting with the first color of the perforated film layer, for example of gray or black color.

In a fourth embodiment of the invention, a cut film assembly comprises:

(i) a cut film comprising a design imaging surface of a first color, for example cut white-on-black vinyl stripes, (ii) a cut adhesive layer, for example a cut clear or black pressure-sensitive adhesive, and (iii) a non-perforated release liner, for example a release-coated paper, for example a silicone-coated paper, or silicone-coated polyester film, comprising a second color contrasting with the first color of the cut film layer, for example gray or black.

In a fifth embodiment, a transparent film assembly comprises;

(i) an imperforate transparent film comprising a print pattern with a design imaging surface of a first color, for example of white ink, (ii) an adhesive layer, typically a water clear pressure-sensitive adhesive (iii) a non-perforated release liner, for example a release-coated paper, for example a silicone-coated paper, or silicone-coated polyester film, comprising a second color contrasting with the first color of the design imaging surface of the print pattern, for example gray or black.

In one or more of these embodiments, the second color is optionally that of the parent material of the non-perforated release liner, or a coating, for example a printed colored layer, or a pigmented release coating.

In one or more of the above embodiments, the second color may contrast with the first color of the light permeable film layer by a difference in graytone of at least 10%, typically having a difference in graytone of at least 30%. Following removal of the release liner, the imaged perforated film layer is applied to the transparent material, for example the glass window of a building, vehicle, bus shelter or payphone kiosk, or a plastic sheet, for example an acrylic or polycarbonate sheet in a retail display.

Design inks, for example cyan (C), magenta (M), yellow (Y) and process black (K) are typically translucent and are typically not clearly visible against a black or dark gray colored liner providing a background to the printed design similar to the in-service condition of an imaged perforated material applied to the window of a relatively dark interior of a building or vehicle.

Various embodiments of the invention include many alternatives and variants to the above embodiments. On example perforated film assembly with a dark contrasting color liner comprises a pre-perforated facestock film and discrete areas of clear pressure-sensitive adhesive on a non-perforated, contrasting color liner. As another example, a perforated film assembly comprises an imperforate, clear supporting film layer, for example a polyester film, laminated to a pre-perforated facestock film, for example a white on black film laminate, a non-perforated layer of clear pressure-sensitive adhesive and a non-perforated, contrasting colored liner.

The non-perforated component of the contrasting color liner optionally comprises an absorbent material, for example a non-sealed black paper, for example adhered to the perforated liner of the first embodiment, for example by means of a heat-activated adhesive coated on the side of the perforated liner remote from the perforated adhesive layer. The imperforate material optionally comprises a recycled paper, for example comprising a grain effect which is optionally preferred to a uniform gray contrasting color. Similarly, the release liner optionally comprises a multi-color effect or coating, for example black printed in a fine pattern on the imperforate material, for example a fine halftone or an irregular mottled, streaked or bitmap pattern. Optionally, the contrasting colored non-perforated liner comprises activated carbon particles acting as a pigment to provide the required color, for example black or gray, which will also absorb solvent and reduce odours from colorants, for example the smell of solvents emitted from solvent inks.

For the first three above-discussed embodiments, a perforated film assembly comprising a contrasting color liner typically presents an array of contrasting colored substantially circular apertures visible to an optical scanning device incorporated into a printing machine, for example an inkjet printing machine. Such systems can gather data from a loaded self-adhesive assembly sheet or roll to:

(i) acquire the size of any perforation anywhere on the loaded sheet or roll;

(ii) acquire the number of perforations per any unit of linear or area measure;

(iii) calculate the precise ratio of material to void;

(iv) ascertain the orientation of a loaded sheet of material;

(v) search for and verify the position and/or presence of a “distinguishing hole” or other distinguishing non-hole feature, for example as a device to distinguish from licensed and infringing products;

(vi) modify the jetting of the image such that ink is substantially prevented from being deposited into voids;

(vii) modify the jetting of the image such that the image intensity and contrast characteristics suit the balance of void to material;

(viii) use the presence of a distinguishing hole to trigger a unique code, symbol, text or logo to be jetted with the image data upon the sheet;

(ix) use the presence of the holes to calculate the extent of the area available as useful imaging area and its orientation;

(x) position the jetted image upon the sheet in such a manner that digital artifacts arising from the visual interaction of void and image areas are avoided or minimized, for example to avoid Moiré fringe effects;

(xi) create and execute a cut path co-extensive with imaged areas and, wherever possible, such that the cut path avoids cutting across voids so optimizing the structural integrity of the sheet; and/or (xii) calculate the extent and amount of tension-induced distortions in the presented array of holes and distort the jetted image, for example so as to compensate when the tension-induced distortion is relieved.

Similar data and benefits can be derived from the cut film or printed print patterns of the fourth and fifth embodiments.

A feature of one or more embodiments of the present invention is that a printer can be confident in the application of less ink to the assembly, where appropriate, than would have been the case with prior art assemblies. Other features of one or more embodiments of the present invention include reduced time of printing for certain types of printing, such as inkjet printing, and less cost of ink. Another feature of one or more embodiments of the present invention is a reduction of the dwell time or elapsed time of any ink curing, as there is typically less ink deposited on the design imaging surface and, with solvent inks, a reduction in the wet to wet interaction of successive ink deposits. Environmental features according to one or more embodiments of the present invention include less VOCs (Volatile Organic Compounds), for example in ink solvents, emitted into the atmosphere.

If prior art perforated or cut film assemblies are inkjet printed, the ink is typically applied to both the print pattern and void areas.

One or more of the first four embodiments may enable selective printing of the perforated or cut film layer with reduced or no ink deposition in the void positions, for example by image recognition systems, for example comprising a camera located ahead of an inkjet printhead array in an inkjet printing machine. Such camera recognition systems can also be used in the fifth embodiment, for example to selectively apply design ink onto a white design imaging surface of a print pattern.

Photographic imaging techniques can be used to print the design, for example on a perforated or cut film light sensitive film, for example by known photographic negative or transparency or digital laser imaging machines, for example as supplied by Durst or Raster Graphics. A black contrasting liner may benefit the photographic imaging process as it absorbs light rather than scattering light back to the imaging hardware or around the void areas where it could cause undesirable image artifacts. In photographic imaging, the contrasting colored liner preferably does not absorb liquids because of the subsequent development process. The release liner optionally comprises "anti-halation" treatments known in the photographic art.

A potential disadvantage with various prior art UV inkjet imaging of a perforated film layer is that ink applied within the holes can acquire sufficient membrane or "in-plane" strength, owing to the chemical cross-linking of UV curing, to be removed with the facestock on removal of the liner. With a gray or black release liner according to one or more embodiments of the present invention, the speed of curing of unwanted ink on the gray or black liner may be reduced, compared to a white or otherwise reflective liner, because a higher proportion of UV rays are absorbed rather than being reflected back through the ink. This greater absorption may tend to reduce the membrane or in-plane strength of the ink within the perforation holes, causing it to be removed with the liner, as desired.

Techniques of undercolor removal can advantageously be used in conjunction with various contrasting colored liners, to help achieve the desired visual effects in the finished product, for example after application to a window, in conjunction with the further saving of ink that undercover removal techniques provide.

Theoretically, the provision of gray areas (as with the prior art white areas) may provide the opportunity for the phenomenon of "simultaneous contrast" in which colors contrasting to the adjacent printed colours could be seen on the gray portions, but the fineness of the printed portions and the gaps between the printed portions, would appear to render this potential effect non-discernible to the naked eye.

Instruments, for example a spectrophotometer, can be used to analyze color and, in the case of the present invention, enable the manipulation of color in a design in order to achieve the desired effect in-situ, typically on a window of a building or vehicle. The contrasting color of the liner will typically be within the range from a neutral or achromatic graytone of 30% to black, preferably 50% to black, and possibly more preferably 70% to black according to various embodiments. If the principal intention of an embodiment of the invention is to improve the perception of the imaged assembly to a print operative, for example to avoid excessive application of ink, the selected graytone will typically be in the range of 60% to 80%. The visual impact or strength of a design is in part determined by contrast in colors, their juxtaposition and their respective proportional areas. A spectrophotometer can be calibrated and adjusted to determine the desirable adjustment, typically of color "value", otherwise referred to as graytone and brightness, together with any undercolor removal, in order to achieve the desired effect for a particular project. Color hues will not typically be varied, although there are various techniques known in the art which may be used, for example adding blue to white to result in an apparently increased brightness of the white.

One basis of determining a commercially practical and desirable background graytone is to consider the visual perception of the imaged self-adhesive assembly compared to a conventionally printed 'standard' image on a white uniform background. Tests were undertaken according to conventional visual perception test methodologies using five naïve participants. The participants observed a total of ten options including:

(i) 8 different backgrounds of a minimum variance of 5% graytone under a printed image on a perforated base material facestock applied to a clear substrate, together with (ii) a printed prior art assembly with the same image on the same type of facestock with a prior art white liner on which solvent inkjet ink had coalesced to cover only a small proportion of each hole area, and a (iii) a printed prior art assembly with the same image on the same type of facestock with a dark graytone liner of the present invention assessed to be approximately 90% graytone, on which solvent inkjet ink had coalesced to cover only a small proportion of each hole area.

All the participants were asked to:

(i) grade the ten options with different background graytones marked with random letters in order of perceived lightness to darkness, (ii) identify which of the randomly lettered samples appeared most like a "standard" version of the image printed on a white unperforated substrate, and (iii) "mark" the likenesses of the prior art imaged sample and the selected option of (ii) on a scale of 20 compared to the "standard" image awarded 20 points and the black, 100% graytone background awarded 10 points.

All participants correctly graded all ten options, including five from 60% to 80% graytone having intervals of 5% graytone. This result is unsurprising given the human brain's known ability to distinguish between hundreds of thousands of different colors. All participants selected the same option as being most like the particular standard image. The marks of likeness of the prior art imaged sample compared to the standard image ranged from 1 to 4, average 2.8, and the likeness marks of the selected option (ii) ranged from 10 to 14, average 12.2, representing a clear indication of the benefits of various embodiments of the invention. This test program also indicated that a graytone background of 30% graytone was considered preferable to the prior art white background and any graytone background within the range of 30% to 100% was considered preferable to the prior art construction with the selected image.

To optimise a particular graytone for a range of images is theoretically possible and complex but in practice has been found not to be critical. To consider the desired likeness of a printed self-adhesive assembly to a "standard" rendering of an image on a solid white background, in order to:

(A) deter print operatives from applying too much ink, and (B) to achieve customer satisfaction on delivery of a printed self-adhesive assembly, a number of selected, representative images in a particular field of commercial advertisements were converted to achromatic or graytone images by a methodology commonplace in the graphic arts. These were processed by prior art methods to produce a weighted average graytone for each image, their percentage values being assessed against samples of graytone with intervals of 5%. An average background graytone was then determined for this range of images by calculating the simple arithmetic average of the weighted averages of graytone of the selected images, being approximately 70%.

Another basis for deciding on a commercially desirable background graytone would be to consider (C) the likely darkness of the typical background interiors to the windows on which the imaged self-adhesive films are to be applied, in order that the printed self-adhesive assemblies can be assessed against their appearance following application to a window. The darkness of interiors is dependent upon many factors, including their spatial size, the area and configuration of all windows, any glazed partitions and doors which allow daylight or external artificial light to enter the space, any internal artificial lighting and the colors, textures and consequent reflectance of the interior surfaces. In certain conditions, the interior could be brighter than the exterior. Specific conclusions can be arrived at for particular markets, for example for imaged perforated base materials to be applied to bus windows, but it is felt that criteria (A) and (B) are typically the most important in determining a generally desirable and applicable contrasting color for a liner. A conclusion of the tests was that a second color (including the option of a multi-color second color) of an achromatic graytone (or average graytone) within the range of 60-80% is generally compatible with a wide range of commercial graphic images but that any achromatic graytone second color in the range of 30-100% is beneficial. A fine, irregular, multicolored achromatic "second color" for the imperforate material of the release liner has been found to be particularly advantageous according to one or more embodiments in reducing the impact of the negative pattern of the print pattern on the perceived design 14.

Additional and/or alternative objects, features, aspects, and advantages of the present invention will become apparent from the following description, the accompanying drawings, and the appended claims.

BRIEF DESCRIPTION OF THE DRAWINGS

For a better understanding of embodiments of the present invention as well as other objects and further features thereof, reference is made to the following description which is to be used in conjunction with the accompanying drawings, where:

FIGS. 1A-C are diagrammatic cross-sections of stages in the manufacture of a perforated film assembly of the first embodiment, having an additional non-perforated contrasting colored liner.

FIGS. 1D-F are diagrammatic cross-sections through the perforated film assembly of FIG. 1C showing its conversion to a vision control panel.

FIG. 4E is a diagrammatic plan of imaged cut film removed from its initial liner.

FIG. 4F is a diagrammatic plan of imaged cut film applied to a replacement liner.

FIG. 4G is a diagrammatic cross-section of FIG. 4F.

DETAILED DESCRIPTION OF EXEMPLARY EMBODIMENTS OF THE INVENTION

Figure 1E:
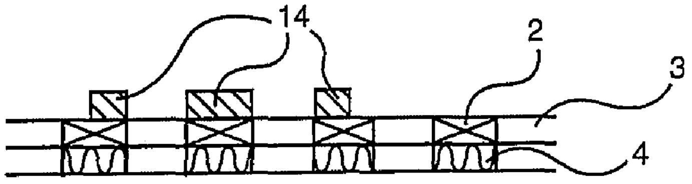
Figure 1F:
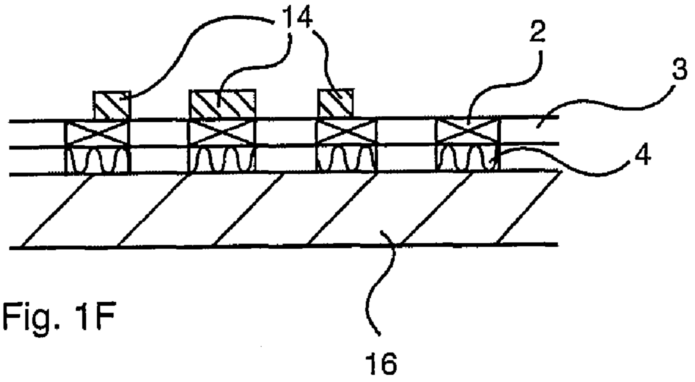
Figure 1G:
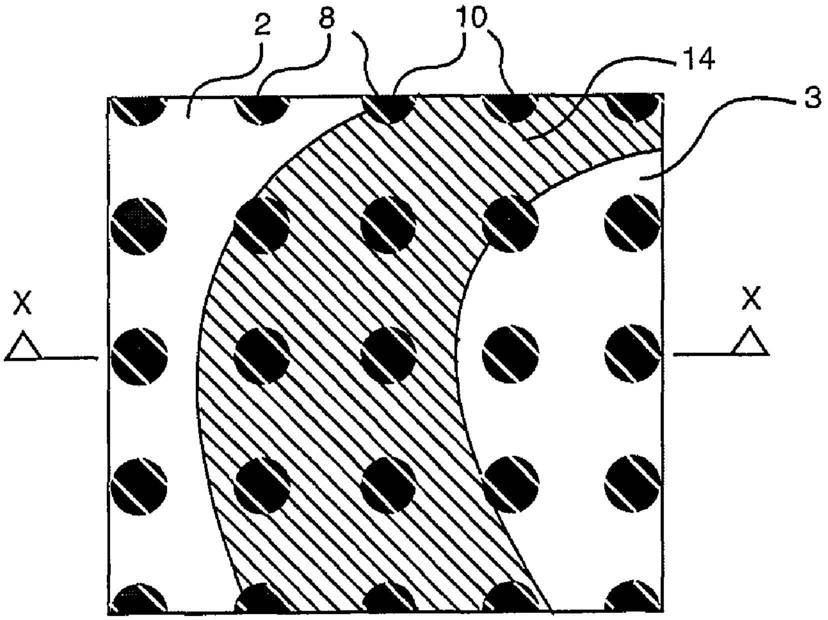
FIG. 1G is a diagrammatic plan of an imaged perforated film assembly with a dark, contrasting colored liner.
Figure 1H:
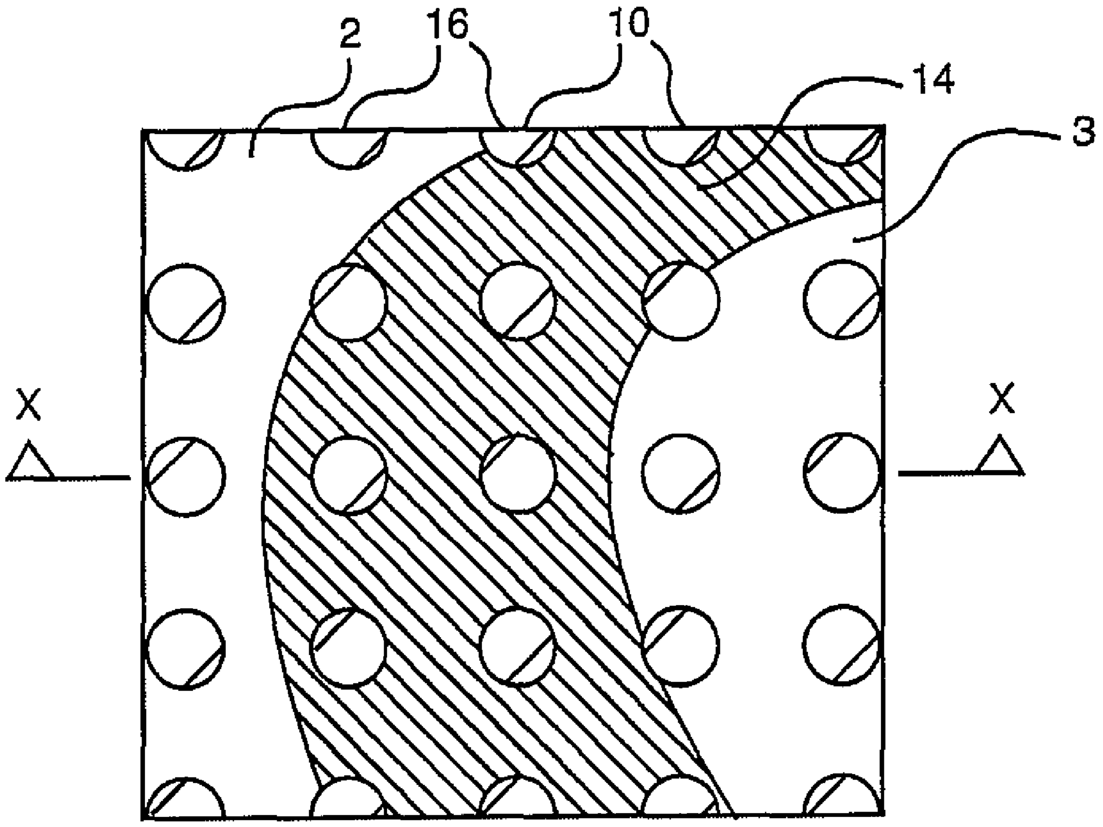
FIG. 1H is a diagrammatic plan of an imaged perforated film assembly applied to a base material.

FIGS. 1A-H illustrate an example of the first embodiment of the invention. FIG. 1A is a cross-section through a self-adhesive film assembly 40 comprising facestock film layer 2 with design imaging surface 20 of a first color, adhesive layer 4 and initial release liner 6. The facestock film layer 2 is, for example, a white on black vinyl laminate or a white vinyl film with a black coating or a white vinyl film. The adhesive layer 4 is typically a pressure-sensitive adhesive, for example a clear acrylic based pressure-sensitive adhesive with a white on black or a white facestock film layer 2 or a black acrylic based pressure-sensitive adhesive with a white facestock film layer 2. A white design imaging surface 20 is typically provided. Initial release liner 6 typically comprises paper with a release surface 17, for example silicone-coated paper. In FIG. 1B, the self-adhesive assembly 40 is perforated with a pattern of holes 10, the holes 10 comprising the transparent areas in light permeable film layer 3 and the remaining facestock film layer 2 defining the print pattern 5. In FIG. 1C, an imperforate material of a second color contrasting with the first color comprises an additional non-perforated backing layer 8. For example, a black or gray paper is added to the perforated initial release liner 6, to form a composite release liner 15, for example by heat-activated adhesive on the surface of perforated initial release liner 6 remote from the facestock film layer 2. As another example, the additional non-perforated backing layer 8 is a plastic film, for example polypropylene heat bonded to the perforated initial release liner 6. Such perforated film self-adhesive assemblies are typically intended to be sold to printing companies for imaging with a design 14, as illustrated in cross-section X-X in FIG. 1D, the location of cross-section X-X being shown in FIG. 1G, for example by lithoprinting, screenprinting or digital printing, for example inkjet printing or thermal mass transfer printing. In order to apply the imaged, self-adhesive perforated material to another surface, composite release liner 15 is first removed as shown in FIG. 1E and perforated adhesive layer 4 is applied to transparent material 16, for example a window, as illustrated in FIG. 1F. FIG. 1G is a plan of the assembly of FIG. 1D in which design 14 on light permeable film layer 3 comprising facestock film layer 2 is seen against the additional non-perforated backing layer of contrasting color 8 through holes 10. FIG. 1H is a plan of imaged light permeable film layer 3 applied to transparent material 16.

Figure 2A:
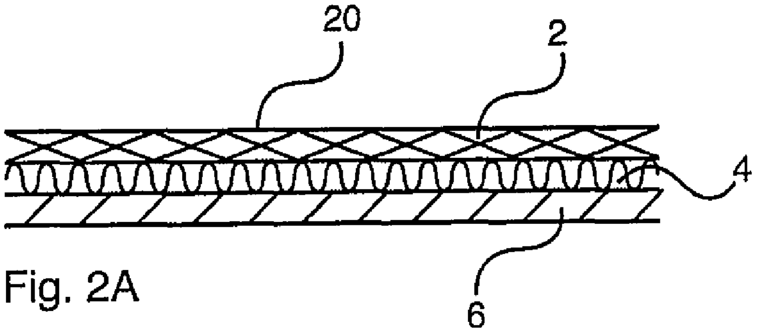
FIGS. 2A-E are diagrammatic cross-sections of stages in the manufacture of a perforated film assembly of the second embodiment, having a dark, contrasting colored, non-perforated replacement liner.
Figure 2B:
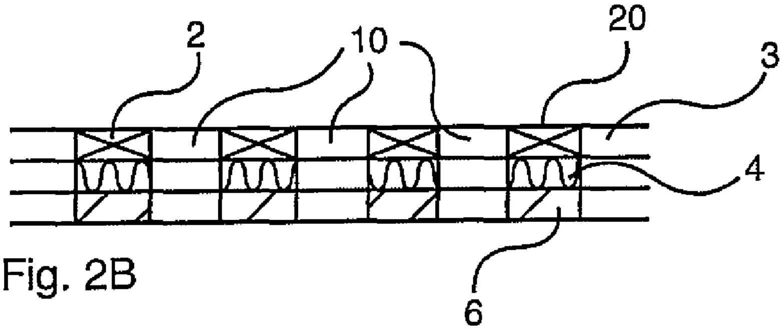
Figure 2C:
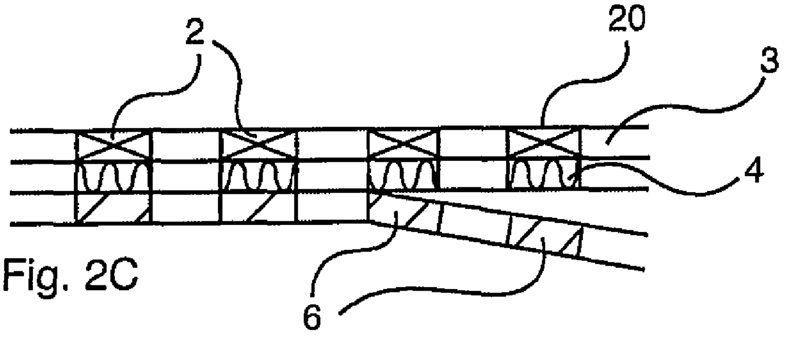
Figure 2D:
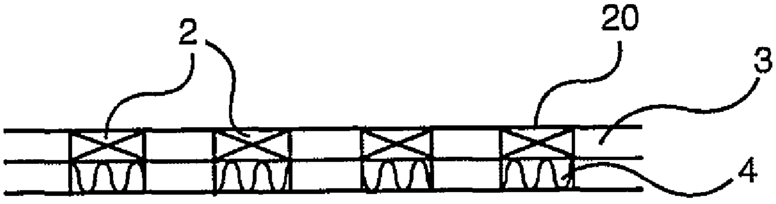
Figure 2E:
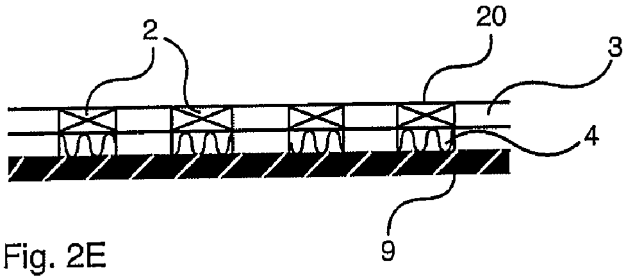
Figure 2F:
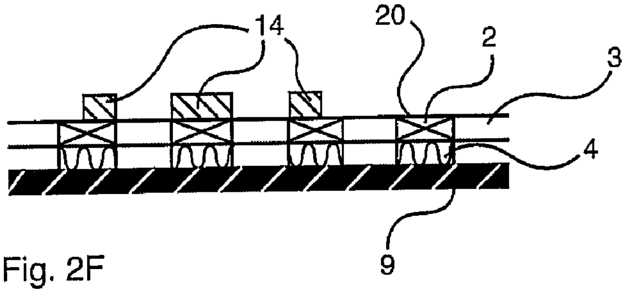
FIGS. 2F-H are diagrammatic cross-sections through the perforated film assembly of FIG. 2E showing its conversion to a vision control panel.
Figure 2G:
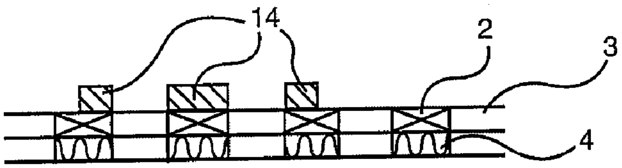
Figure 2H:
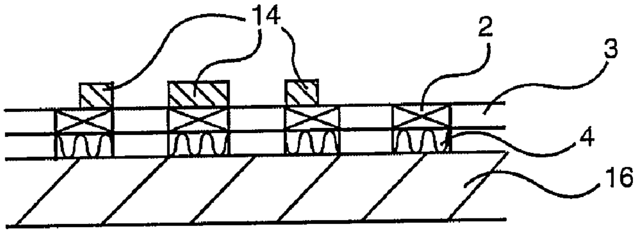
Figure 2J:
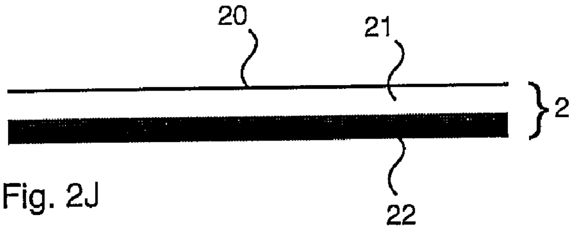
FIG. 2J is a diagrammatic cross-section through a liner.

FIGS. 2A-K illustrate an example of the second embodiment of the invention. FIGS. 2A and 2B are similar to FIGS. 1A and 1B. In FIG. 2C, perforated initial release liner 6 is being removed to leave the surface of perforated adhesive layer 4 exposed, as shown in FIG. 2D. A replacement release liner 9 of a contrasting second color is applied to the exposed adhesive surface in FIG. 2E, forming another type of perforated self-adhesive film assembly which is typically intended to be sold to printing companies for imaging with a design 14, as shown in FIG. 2F. In order to apply the imaged, perforated self-adhesive material to another surface, replacement release liner 9 is removed, as illustrated in FIG. 2G, and the exposed adhesive surface is applied to transparent material 16, as shown in FIG. 2H. FIG. 2J is a cross-section through an example of a facestock film layer 2 comprising a light-colored, light-reflective layer 21, for example a white pvc film layer with imaging surface 20, optionally comprising a print-receptive coating, for example to be receptive to water-based inkjet inks, laminated to a dark-colored, light-absorbing layer 22, for example a black pvc film layer. In the art of vision control materials, a white imaging surface is typically provided for imaging with a design and a black layer is typically provided to maximize on the see-through capability, for example in a so-called one-way vision control panel. Such panels are provided, for example, on the windows of a bus as part of a "bus wrap" advertisement.

Figure 2K:
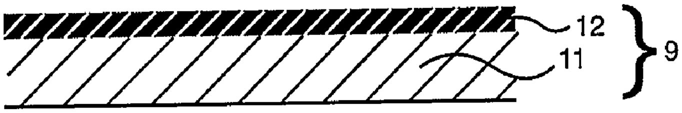
FIG. 2K is a diagrammatic cross-section through a facestock film.

The replacement release liner 9 is optionally self-colored, for example a black or gray sheet of paper with a substantially clear silicone release coating or, as illustrated in FIG. 2K, is a base material 11, for example of white paper, with an applied coating 12 of second color contrasting with the first color of the design imaging surface, for example a black or gray ink onto which is applied a substantially clear silicone release coating, or applied coating 12 is a release coating of contrasting color, for example as disclosed in U.S. Pat. No. 5,250,336.

Figure 3A:
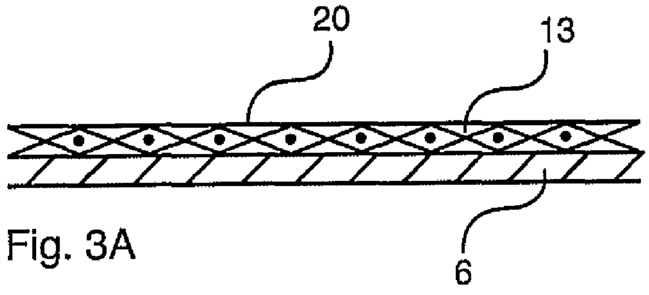
FIGS. 3A-E are diagrammatic cross-sections of stages in the manufacture of a perforated film assembly of the third embodiment, having a static cling film facestock.
Figure 3B:
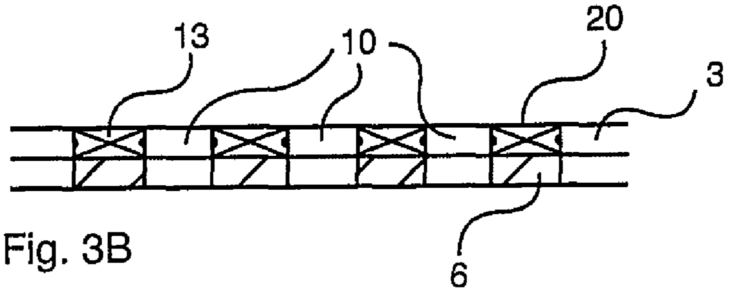
Figure 3C:
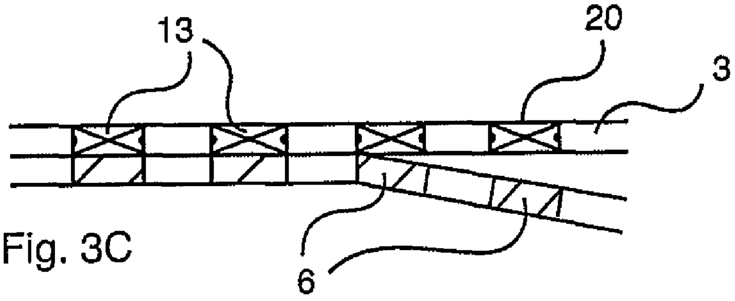
Figure 3D:
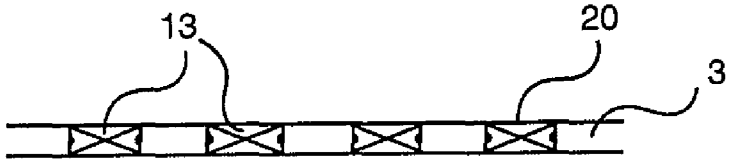
Figure 3E:
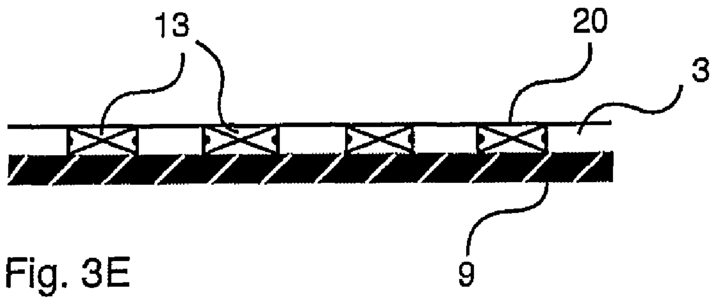
Figure 3F:
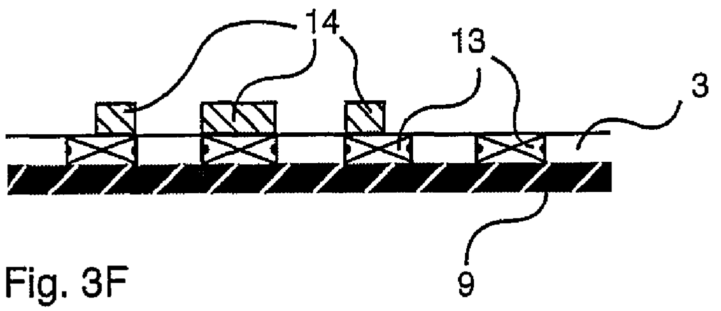
FIGS. 3F-H are diagrammatic cross-sections through the perforated film assembly of FIG. 3E showing its conversion to a vision control panel.
Figure 3G:
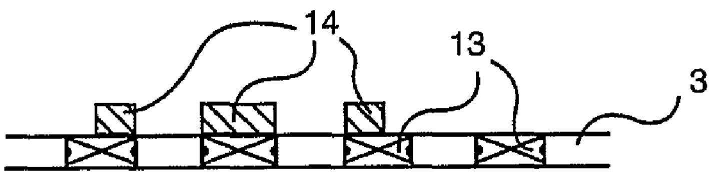
Figure 3H:
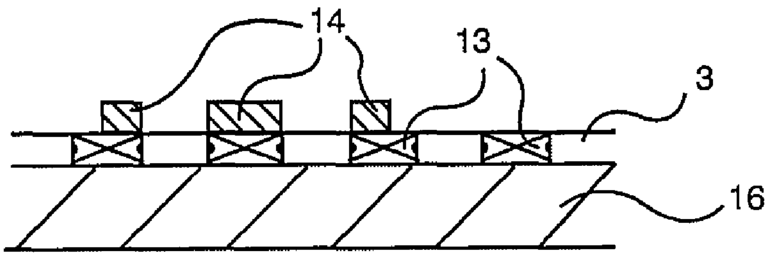

FIGS. 3A-H illustrate an example of the third embodiment of the invention. FIG. 3A illustrates a cling film 13 with design imaging surface 20 of a first color, for example a highly plasticized pvc cling film, with an initial release liner 6. This static cling film assembly is perforated in FIG. 3B with holes 10. Perforated cling film 13 forms light permeable film layer 3. The cling film 13 optionally comprises a white design imaging surface, for example a white highly plasticized pvc film or a white print-treated polyester film laminated to a black highly plasticized pvc film. Optionally, the perforated initial release liner 6 is removed, as illustrated in FIGS. 3C and D and a replacement release liner 9 of second color contrasting with the first color is applied, as shown in FIG. 3E, to form another type of perforated film assembly, typically intended to be sold to printing companies. FIG. 3F illustrates design 14 applied to the perforated cling film 13 and FIG. 3G shows the replacement liner removed to enable application of the imaged perforated cling film layer 13 to a transparent material 16, typically a window, as shown in FIG. 3H.

Figure 4A:
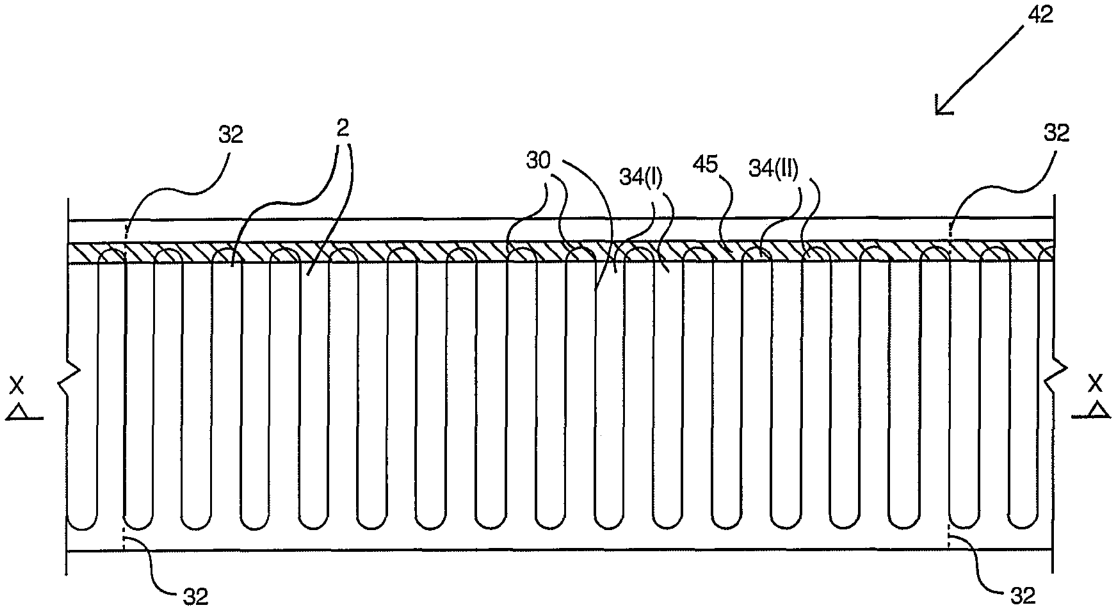
FIG. 4A is a diagrammatic plan of a cut film assembly of the fourth embodiment.
Figure 4B:
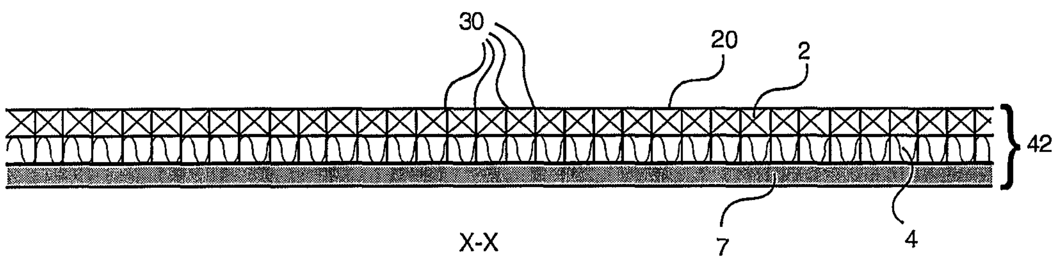
FIG. 4B is a diagrammatic cross-section of the cut film assembly of FIG. 4A with a dark, contrasting colored liner.
Figure 4C:
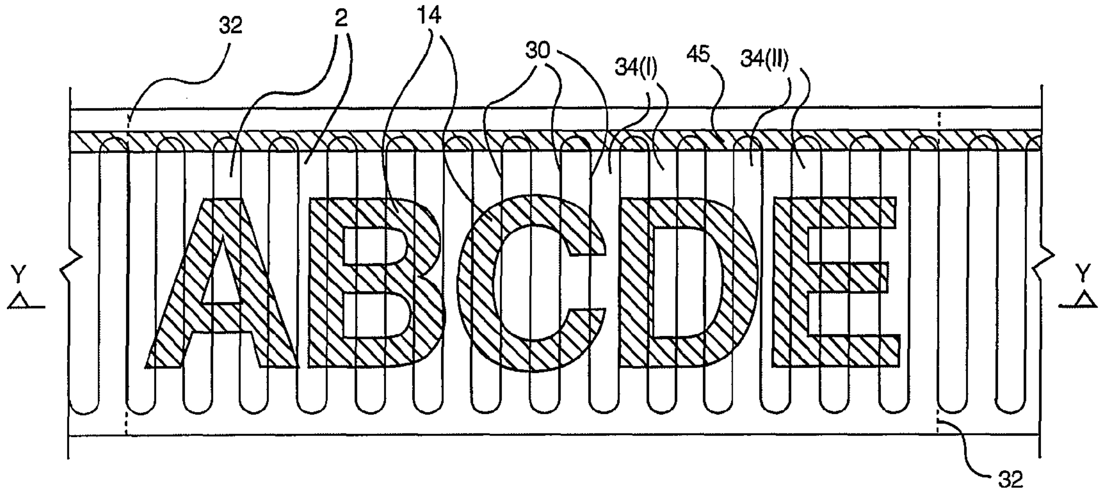
FIG. 4C is a diagrammatic plan of an imaged cut film assembly.
Figure 4D:
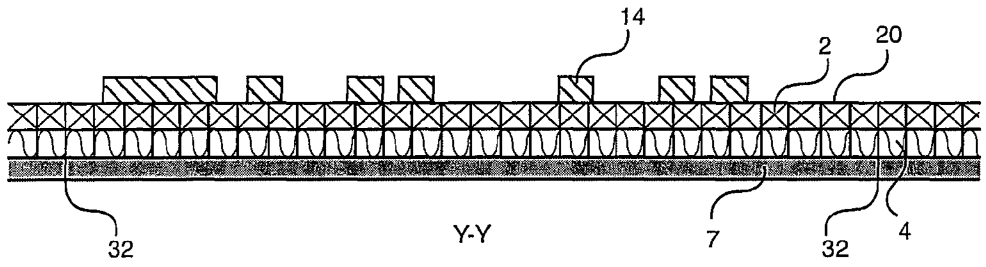
FIG. 4D is a diagrammatic cross-section through the imaged cut film assembly of FIG. 4C.
Figure 4H:
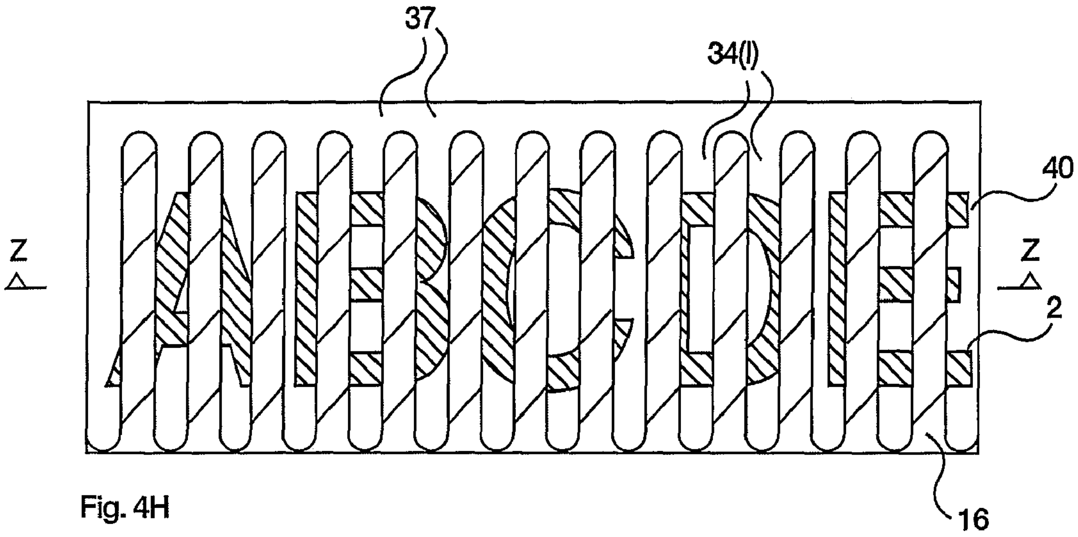
FIG. 4H is a diagrammatic plan of imaged cut film removed from a replacement liner and applied to a transparent base material.
Figure 4J:
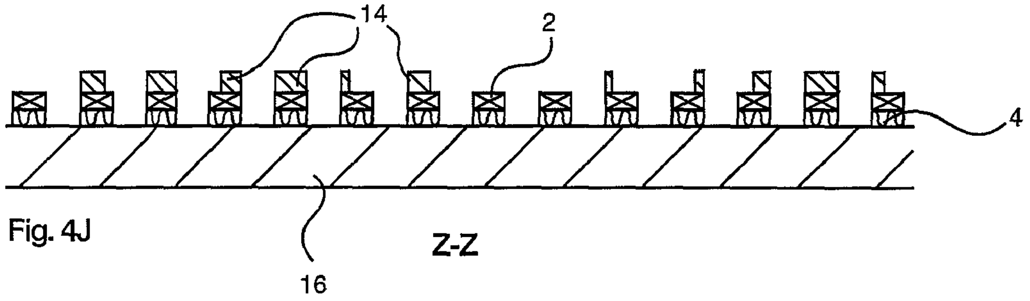
FIG. 4J is a diagrammatic cross-section of FIG. 4H.
Figure 4K:
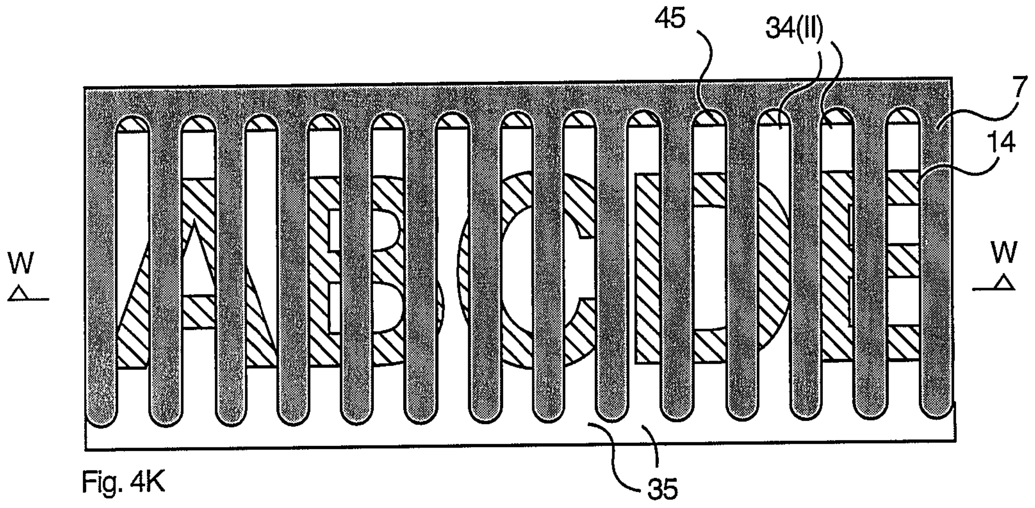
FIG. 4K is a diagrammatic plan of FIG. 4C with imaged cut film removed.
Figure 4L:
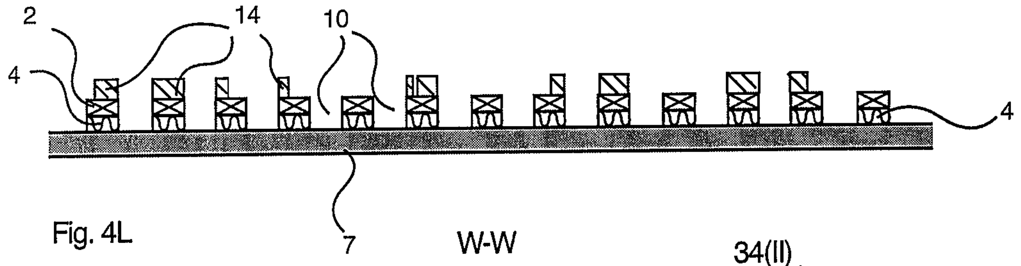
FIG. 4L is a diagrammatic cross-section of FIG. 4K.
Figure 4M:
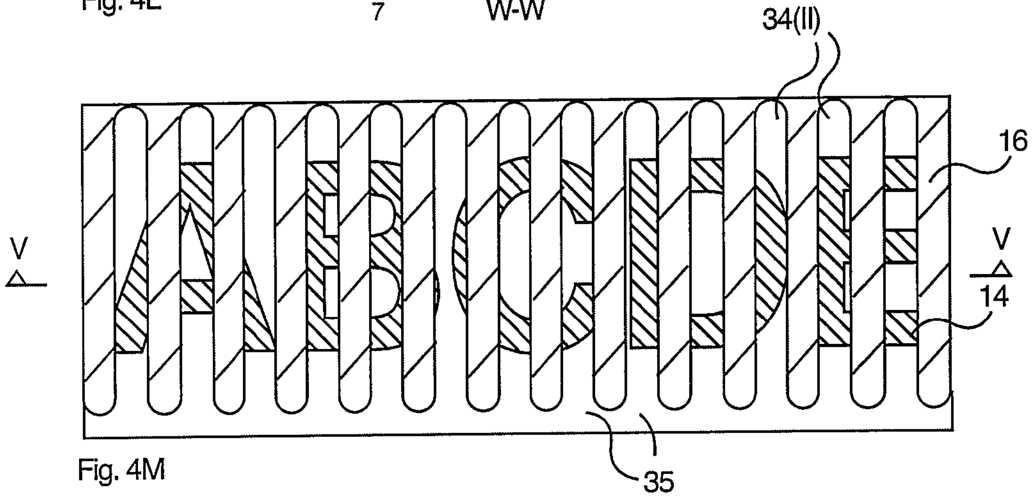
FIG. 4M is a diagrammatic plan of the residual imaged cut film applied to a transparent base material.
Figure 4N:
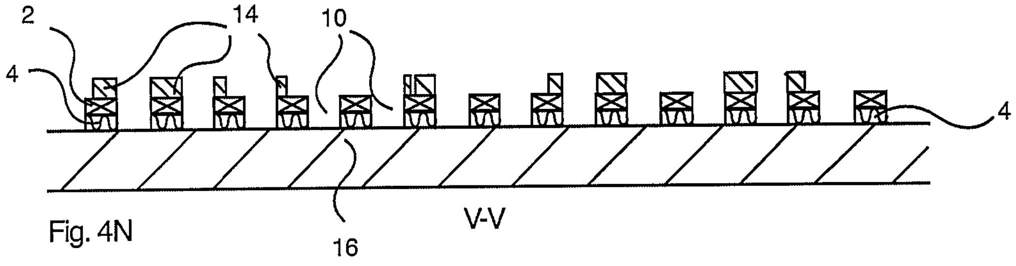
FIG. 4N is a diagrammatic cross-section of FIG. 4M.
Figure 4P:
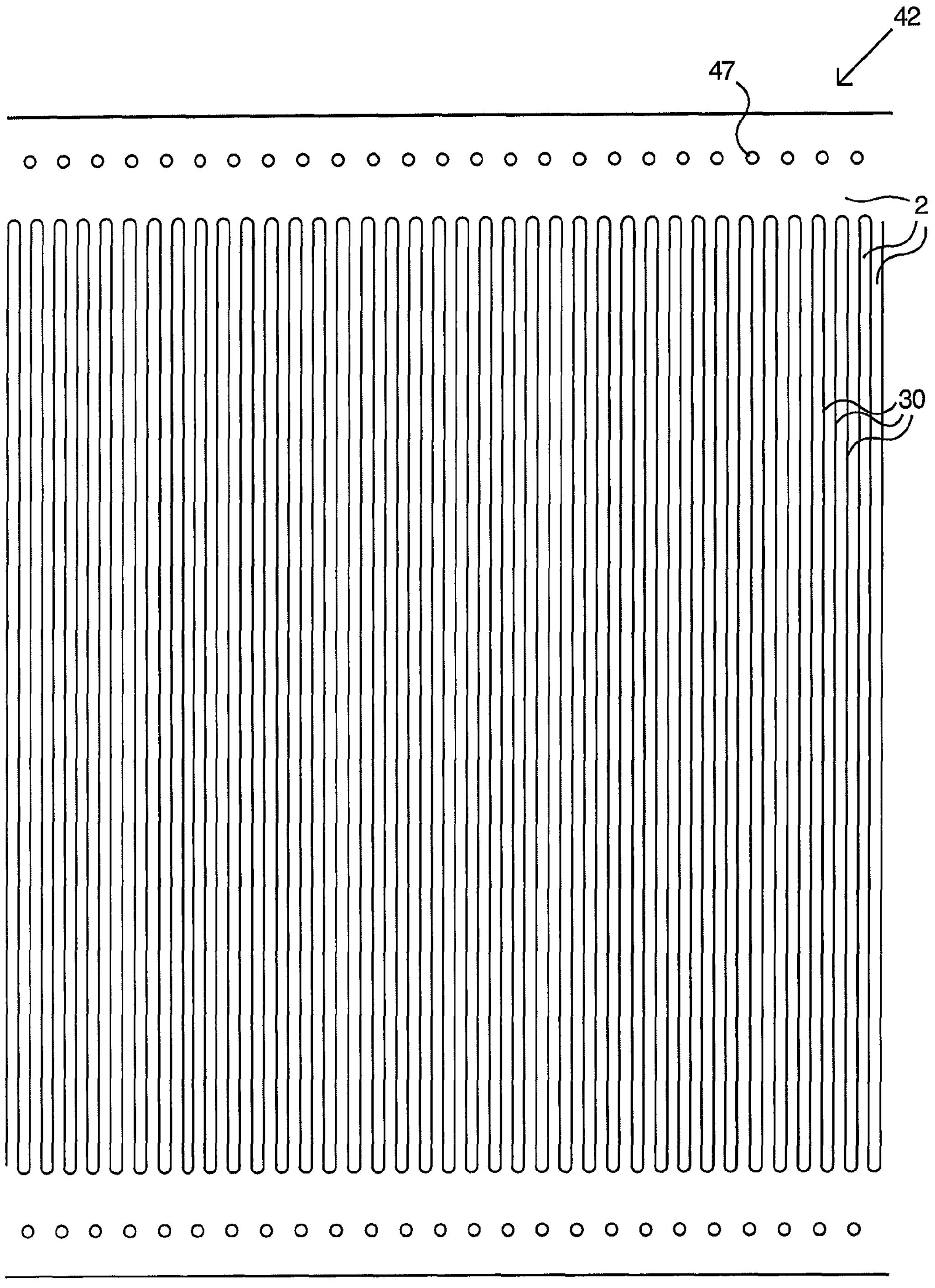
FIG. 4P is a diagrammatic plan of another cut film assembly.

FIGS. 4A-N illustrate an example of the fourth embodiment of the invention. FIG. 4A is a plan of a kiss-cuttable self-adhesive film assembly 42 with cross-section X-X shown in FIG. 4B which includes adhesive layer 4 with contrasting color release liner 7. Facestock film layer 2 with imaging surface 20 is kiss-cut in cutting pattern 30, providing elongate areas or "stripes" of cut film and optional transparent release coating 45 encompassing the leading edges of elongate areas 34(II) to allow the selective removal of elongate areas 34(I) over the length of the self-adhesive vinyl material between cuts 32 in accordance with U.S. Patent Application 60/727,462 (International App. No. PCT/IB2006/004217). FIG. 4C shows facestock film layer 2 imaged with design 14, also shown in cross-section Y-Y in FIG. 4D. FIG. 4E shows elongate areas 34(I) removed for example by means of connector area 37 and/or an application tape (not shown) applied to the facestock film layer 2. Release coating 45 prevents the leading edges of elongate areas 34(II) lifting in this process, which may also be achieved by other means disclosed in PCT/IB2006/004217. This removed cut film may be applied directly to transparent material 16, as illustrated in FIGS. 4H and J, or may be applied to contrasting colored replacement release liner 9, as illustrated in FIGS. 4F and 4G, for example to enable the imaged cut film self-adhesive assembly to be moved to another location, for example a building, for application to transparent material 16, for example a window, after removal of the contrasting colored replacement release liner 9, to form a vision control panel as illustrated in FIGS. 4H and J (transparent release layer 45 not shown). FIG. 4K illustrates the imaged cut film comprising elongate areas 34 (II) remaining on contrasting color release liner 7, also shown in cross-section W-W in FIG. 4L. The design 14 is visible against the contrasting color release liner 7. The elongate film areas 34 (II) are connected by a residual connector area 35, which is optionally retained in the finished panel of FIGS. 4M and 4N, following removal of imperforate release liner 7 and application to a transparent material 16, typically with the aid of an application tape (not shown), or the residual connector area 35 is optionally removed. FIG. 4P illustrates another kiss-cuttable self-adhesive cut film assembly 42 with cutting pattern 30 and sprocket holes 47, for example to enable movement of the assembly through a printing machine, for example the Gerber Edge™ (a trademark of Gerber Scientific Products, Inc., US), a thermal mass transfer digital printing machine. The assembly 42 is otherwise typically processed as FIGS. 4A-N or other variant, for example as described above or in PCT/IB2006/004217. There are many potential variants to the above method. For example, the design can be applied to the facestock film layer 2 prior to kiss-cutting the self-adhesive vinyl stripes. As another example, it has been found that alternate elongate areas can be removed by an application tape without the need for a release layer 45.

Figure 5A:
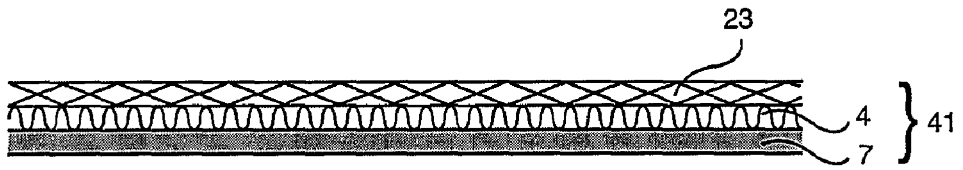
FIGS. 5A-D are diagrammatic cross-sections through stages of production of a vision control panel comprising a transparent facestock film layer, according to the fifth embodiment.
Figure 5B:
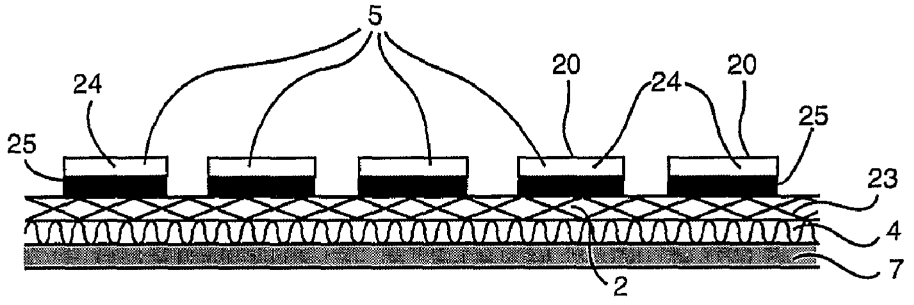
Figure 5C:
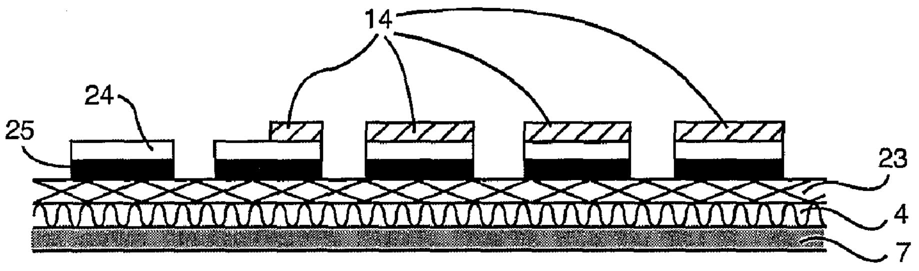
Figure 5D:
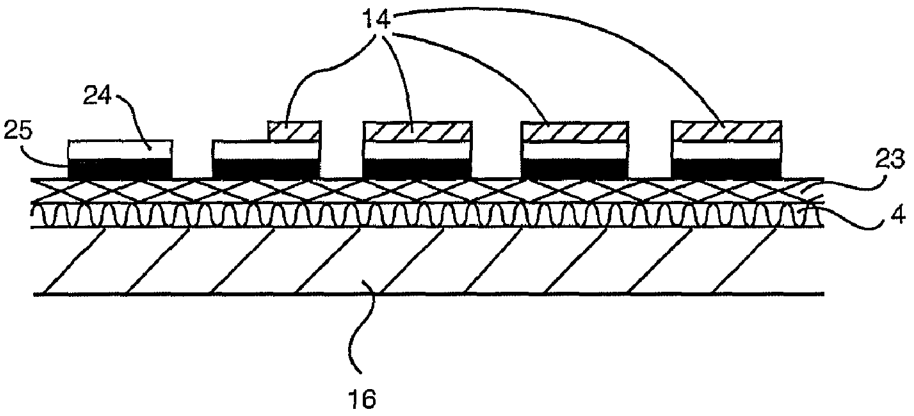

FIGS. 5A-C illustrate an example of the fifth embodiment of the invention. The self-adhesive imperforate transparent film assembly 41 of FIG. 5A comprises imperforate transparent film 23, for example a polyester film, adhesive layer 4, for example a clear acrylic-based pressure-sensitive adhesive, and imperforate release liner 7, for example a black or dark gray silicone-coated paper. In FIG. 5B, a print pattern 5 of lines, for example of a first color of white ink 24 with white design imaging surface 20 on black ink 25 has been printed, for example by screen printing according to one of the methods of substantially exact registration printing disclosed in U.S. U.S. Reissue Pat. No. 37,186. Design 14 is applied to imaging surface 20, for example by one of the methods of printing with differential receptivity disclosed in U.S. Pat. No. 6,267,052, for example digital thermal mass transfer of the design 14 to imaging surface 20, which is receptive to digitally applied pigmented resin whereas the imperforate transparent film 23 is not receptive to this imaging method and remains transparent between the printed lines. The design 14 is seen against the imperforate release liner 7 of a second color contrasting with the first color of design imaging surface 20, for example a 70% graytone. In FIG. 5D, the imperforate release liner 7 has been removed and the imaged imperforate transparent film 23 has been applied to transparent material 16, for example a glass window, by means of adhesive layer 4.

Figures 6A, 6B, 6C, 6D, 6E:
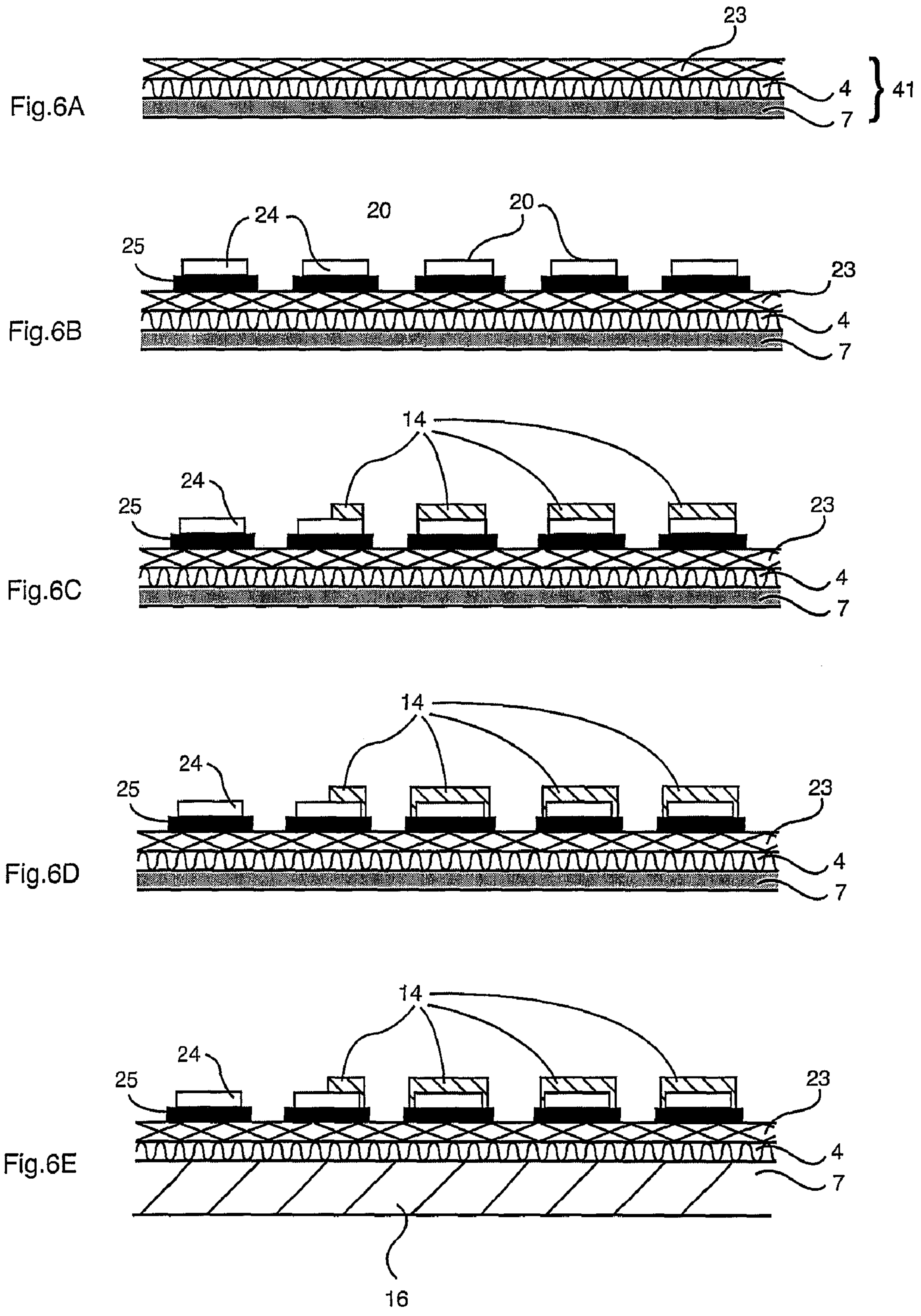
FIGS. 6A-E are diagrammatic cross-sections through stages of production of a vision control panel comprising a transparent facestock film layer, according to the fifth embodiment.

FIGS. 6A-B illustrate another example of the fifth embodiment of the invention. This is similar to the example of FIGS. 5A-B except that the print pattern, typically of white ink 24 on black ink 25 is applied by printing methods without exact registration of the two layers, the white ink lines 24 with design imaging surface 20 being printed within the width of the black ink lines 25. The release liner 7 is of a second color, for example black, contrasting with the first color, for example white, which enables an optical scanning system to identify the extent of the white ink layer 24 against the black background of black ink 25 and black release liner 7 and to instruct a digital printing machine to deposit design 14 substantially within white ink lines 24, as shown in FIG. 6C. This process can be assisted by the variant of FIG. 6D, in which the lines of design 14 are printed within black lines 25 but outside white lines 24. If the design inks are translucent, for example CMYK process inks, the design 14 will be visible against the white ink lines 24 but will be of substantially reduced visibility against the black edges of the lines, for example in accordance with U.S. Pat. No. 6,210,776, to provide the desired color rendering or perceived colors of design 14 against the white lines 24. In FIG. 6E, the imperforate release liner 7 has been removed and the imaged imperforate transparent film 23 has been applied to transparent material 16, for example a glass window, by means of adhesive layer 4, for example a transparent acrylic based pressure-sensitive adhesive.

Figure 7A:
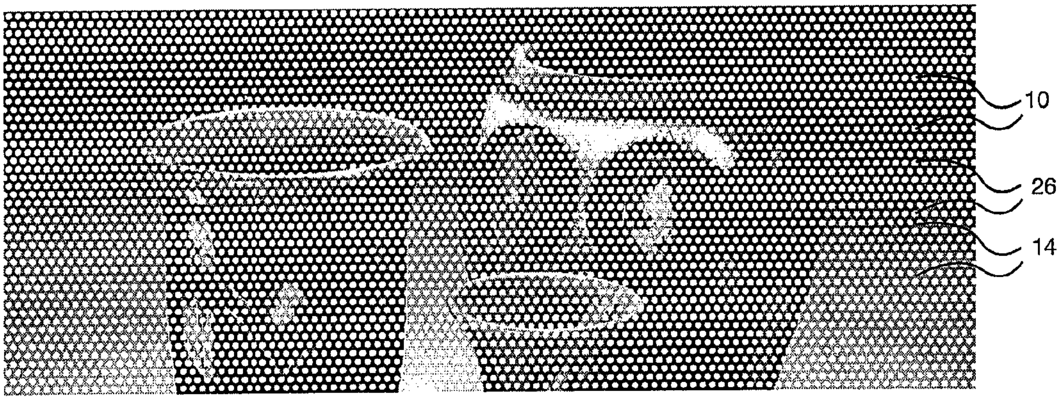
FIG. 7A is a view of an imaged prior art perforated self-adhesive film assembly.
Figure 7B:
FIG. 7B is the full image of FIG. 7A.
Figure 7C:
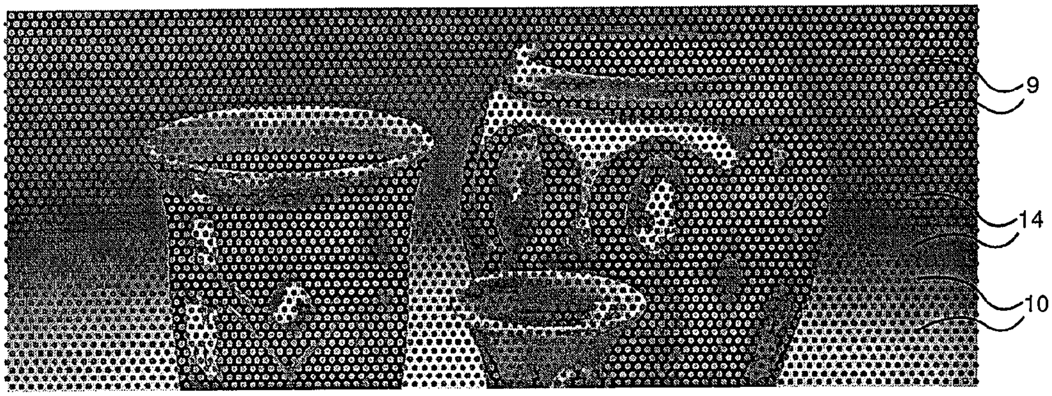
FIG. 7C is an imaged perforated self-adhesive film assembly of the present invention.

FIG. 7A represents a conventional perforated self-adhesive film assembly imaged with design 14 revealing prior art white release liner 26 through holes 10, which produces a whiter, lighter, weaker, paler image than the intended, full design 14 of FIG. 7B. FIG. 7C illustrates the same design 14 applied to an assembly of an embodiment of the invention with contrasting colored liner 9, in this example of 60% graytone visible through holes 10, which can be seen to represent the full design of FIG. 7B much better than the prior art image of FIG. 7A. The invention provides a better impression to customers upon receipt of the imaged assembly and makes it less likely for a print operative to apply extra ink in seeking to obtain a good image than with the prior art assembly of FIG. 7A. The image of FIG. 7C also provides a better representation of a vision control panel comprising the imaged perforated film applied to a window, when seen in daylight with a relatively dark interior space behind the panel.

It is possible with one or more of the above embodiments and many more embodiments to arrange that an “engineered substrate” is formed comprising a light permeable film layer, a print pattern comprising a plurality of discrete base layer areas and/or a plurality of discrete areas devoid of the base layer, the base layer comprising a design imaging surface of a first color, and a release liner comprising an imperforate material of a second color contrasting with the first color by a graytone interval of at least 10%, the second color being visible through the light permeable film layer. Such engineered substrates are optionally mass produced for sale to printers for application of the design comprising a design color layer to form an imaged light permeable film layer, whereupon the second color of the imperforate material typically remains visible through the light permeable film layer, the imperforate material being imaged or the second color being visible in combination with and optionally amended by the design color layer or design color layers which are typically translucent. The design is visible in conjunction with the revealed second color and/or amended second color in the transparent portions of the light permeable film layer.

In addition to the previously mentioned benefits of one or more embodiments, an imaged assembly provides an advantageous way of demonstrating to potential customers of see-through graphic panels how the product would work in situ. A full image printed on a solid white background gives a false impression of the achievable quality in a see-through in situ, which necessarily is not as good as a full image and may unduly raise expectations leading to subsequent dissatisfaction, whereas a prior art sample with a white release liner gives a very poor impression of the achievable quality in situ, almost certainly causing the loss of a proportion of sales as a result. Imaged assemblies of one or more embodiments of the present invention will assist the realistic demonstration of the potential quality of see-through graphics, for example on the windows of buildings and vehicles, and thus assist sales.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. An assembly comprising a light-permeable film layer, a release liner, and a print pattern, said print pattern comprising a base layer, said base layer comprising:

(i) a perforated film, (ii) a cut film layer, said cut film layer cut into a plurality of elongate film layer areas, or (iii) marking material applied to an imperforate transparent film, said print pattern sub-dividing said film layer into a plurality of discrete base layer areas and/ or a plurality of transparent areas, said base layer comprising a design imaging surface of a first color, said release liner comprising an imperforate material, said release liner comprising a release surface, characterized in that said imperforate material when viewed through said light permeable film layer comprises a second color contrasting with said first color by the graytone of said second color differing from the graytone of said first color by at least 10%, wherein said first color is white.

2. An assembly as claimed in claim 1, where said light permeable film layer comprises a perforated film.

3. The assembly of claim 2, wherein said second color comprises a graytone percentage within the range of 60%-80%.

4. The assembly of claim 2, wherein said second color contrasts with said first color by the graytone of said second color differing from the graytone of said first color by at least 30%.

5. The assembly of claim 2, wherein said release liner comprises a composite release liner comprising a perforated initial release liner attached to the imperforate material.

6. An assembly as claimed in claim 1, wherein said light permeable film layer comprises a cut film.

7. The assembly of claim 6, wherein said second color comprises a graytone percentage within the range of 60%-80%.

8. The assembly of claim 6, wherein said second color contrasts with said first color by the graytone of said second color differing from the graytone of said first color by at least 30%.

9. An assembly as claimed in claim 1, wherein said light permeable film layer comprises an imperforate transparent film.

10. An assembly as claimed in claim 1, wherein said second color is gray.

11. An assembly as claimed in claim 10, wherein said second color comprises a graytone percentage within the range of 60%-80%.

12. An assembly as claimed in claim 1, wherein said assembly comprises an adhesive layer intermediate said light permeable film layer and said release liner, wherein said adhesive comprises a pressure-sensitive adhesive.

13. An assembly as claimed in claim 1, wherein said second color contrasts with said first color by the graytone of said second color differing from the graytone of said first color by at least 30%.

14. An assembly as claimed in claim 1, wherein the imperforate material comprises multiple colors with an average graytone percentage above 30%.

15. The assembly of claim 1, wherein:

the release liner is releasably attached to the light-permeable film layer, and a side of the release liner that faces the light-permeable film layer comprises said second color such that removal of the release liner from the light-permeable film layer separates the second colored side from the light-permeable film layer.

16. The assembly of claim 1, wherein said second color is black.

17. The assembly of claim 1, wherein said second color comprises a graytone percentage within the range of 50%-100%.

18. The assembly of claim 1, wherein said assembly comprises an adhesive layer intermediate said light permeable film layer and said release liner.

19. The assembly of claim 1, wherein said light permeable film layer comprises a cling film.

20. The assembly of claim 19, wherein said cling film comprises highly plasticized polyvinyl chloride (PVC).

21. The assembly of claim 1, wherein said imperforate material comprises an applied coating of said second color.

22. The assembly of claim 1, wherein said imperforate material comprises a release coating of said second color.

23. The assembly of claim 1, wherein a cross-section can be taken through said assembly comprising said release liner having two outer edges, and between said two outer edges of said release liner a plurality of alternate portions of said base layer and portions devoid of said base layer, each of said portions of said base layer having two outer edges, and wherein the average width between said two outer edges of said plurality of portions of said base layer is less than 6 mm and the average width of the portions devoid of said base layer is less than 6 mm.

24. The assembly of claim 1, wherein the release liner is releasably attached to the light-permeable film layer, and the imperforate material of the release liner comprises the second color.

25. An imaged assembly comprising a light-permeable film layer, a release liner, and a print pattern, said print pattern comprising a base layer, said base layer comprising:

(i)a perforated film, (ii) a cut film layer, said cut film layer cut into a plurality of elongate film layer areas, or (iii) marking material applied to an imperforate transparent film, said print pattern sub-dividing said film layer into a plurality of discrete base layer areas and/ or a plurality of transparent areas, said base layer comprising a design imaging surface of a first color, said release liner comprising an imperforate material comprising a second color contrasting with said first color by the graytone of said second color differing from the graytone of said first color by at least 10%, said release liner comprising a release surface, and a design comprising a design color layer applied to said design imaging surface to form an imaged light permeable film layer, characterized in that said imperforate material is visible through said light permeable film layer, and wherein said second color or said second color amended by said design color layer is visible through said light permeable film layer, wherein said first color is white.

26. An imaged assembly as claimed in claim 25, where said light permeable film layer comprises a perforated film.

27. The assembly of claim 26, wherein said second color comprises a graytone percentage within the range of 60%-80%.

28. The assembly of claim 26, wherein said second color contrasts with said first color by the graytone of said second color differing from the graytone of said first color by at least 30%.

29. The assembly of claim 26, wherein said release liner comprises a composite release liner comprising a perforated initial release liner attached to the imperforate material.

30. An imaged assembly as claimed in claim 25, wherein said light permeable film layer comprises a cut film.

31. The assembly of claim 30, wherein said second color comprises a graytone percentage within the range of 60%-80%.

32. The assembly of claim 30, wherein said second color contrasts with said first color by the graytone of said second color differing from the graytone of said first color by at least 30%.

33. An imaged assembly as claimed in claim 25, wherein said light permeable film layer comprises an imperforate transparent film.

34. An imaged assembly as claimed in claim 25, wherein said second color is gray.

35. An imaged assembly as claimed in claim 34, wherein said second color comprises a graytone percentage within the range of 60%-80%.

36. An imaged assembly as claimed in claim 25, wherein said assembly comprises an adhesive layer intermediate said light permeable film layer and said release liner, wherein said adhesive comprises a pressure-sensitive adhesive.

37. The assembly of claim 25, wherein the design is perceived to be visually independent of the elements of the print pattern such that when an observer adjacent to one side of the imaged assembly from which the design is normally visible, moves away from the one side in a perpendicular direction from the imaged assembly until discrete and/or interconnected elements of the print pattern can no longer be resolved by the eye of the observer, the design remains clearly perceptible.

38. The assembly of claim 25, wherein:

the release liner is releasably attached to the light-permeable film layer, and a side of the release liner that faces the light-permeable film layer comprises said second color such that removal of the release liner from the light-permeable film layer separates the second colored side from the light-permeable film layer.

39. The assembly of claim 25, wherein the release liner is releasably attached to the light-permeable film layer, and the imperforate material of the release liner comprises the second color.

* * * * *